(12) United States Patent
Abe et al.

(10) Patent No.: US 10,507,843 B2
(45) Date of Patent: Dec. 17, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masaaki Abe, Wako (JP); Kunimichi Hatano, Wako (JP); Masahiko Asakura, Wako (JP); Naoto Sen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 279 days.

(21) Appl. No.: 15/597,276

(22) Filed: May 17, 2017

(65) Prior Publication Data

US 2017/0334452 A1 Nov. 23, 2017

(30) Foreign Application Priority Data

May 19, 2016 (JP) .................................. 2016-100609

(51) Int. Cl.
*B60W 50/08* (2012.01)
*B60W 10/04* (2006.01)
(Continued)

(52) U.S. Cl.
CPC ........... *B60W 50/082* (2013.01); *B60N 2/797* (2018.02); *B60W 10/04* (2013.01); *B60W 10/20* (2013.01);
(Continued)

(58) Field of Classification Search
CPC .... B60W 50/082; B60W 10/04; B60W 10/20; B60W 50/10; B60W 2420/42; B60W 2540/04; B60W 2710/20; B60W 2720/10; G01C 21/3658; G01C 21/34; G05D 1/0088; G05D 2201/0213; G01S 19/13; G01S 19/49

USPC .......................................................... 701/23
See application file for complete search history.

(56) References Cited

U.S. PATENT DOCUMENTS

2004/0129486 A1* 7/2004 Chernoff ................... B60T 7/08
180/315

FOREIGN PATENT DOCUMENTS

CN 105593104 A 5/2016
CN 107031468 A 8/2017
(Continued)

OTHER PUBLICATIONS

Office Action dated Jan. 23, 2019, issued in counterpart Chinese Application No. 201710271723.9, with English translation. (18 pages).
(Continued)

*Primary Examiner* — Gertrude Arthur Jeanglaude
(74) *Attorney, Agent, or Firm* — Westerman, Hattori, Daniels & Adrian, LLP

(57) ABSTRACT

A vehicle control system including: a driving controller configured to execute any one of automated driving for performing at least one of velocity control and steering control over a vehicle by executing any one of multiple driving modes having different automatic control levels, and manual driving for performing both of the velocity control and steering control over the vehicle based on operation on a main operator by an occupant of the vehicle; an armrest for an occupant sitting on a driver's seat of the vehicle to put his/her arm on; and an armrest relative position controller configured to control a drive unit so that a position of the armrest relative to the occupant sitting on the driver's seat varies between the automated driving and the manual driving executed by the driving controller.

14 Claims, 14 Drawing Sheets

(51) Int. Cl.
*B60W 10/20* (2006.01)
*B60W 50/10* (2012.01)
*G05D 1/00* (2006.01)
*G01C 21/36* (2006.01)
*B60N 2/75* (2018.01)
*G01C 21/34* (2006.01)
*G01S 19/13* (2010.01)
*G01S 19/49* (2010.01)

(52) U.S. Cl.
CPC ......... *B60W 50/10* (2013.01); *G01C 21/3658* (2013.01); *G05D 1/0088* (2013.01); *B60W 2420/42* (2013.01); *B60W 2420/52* (2013.01); *B60W 2540/04* (2013.01); *B60W 2710/20* (2013.01); *B60W 2720/10* (2013.01); *G01C 21/34* (2013.01); *G01S 19/13* (2013.01); *G01S 19/49* (2013.01); *G05D 2201/0213* (2013.01)

(56) References Cited

FOREIGN PATENT DOCUMENTS

| | | | |
|---|---|---|---|
| JP | 2017-94899 | A | 6/2017 |
| JP | 2017-178145 | A | 10/2017 |
| WO | 2007/034567 | A1 | 3/2007 |
| WO | 2015/011866 | A1 | 1/2015 |
| WO | 2015/132119 | A1 | 9/2015 |

OTHER PUBLICATIONS

Office Action dated Feb. 27, 2018, issued in counterpart Japanese Application No. 2016-100609, with machine translation. (6 pages).

\* cited by examiner

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-100609, filed May 19, 2016, entitled "Vehicle Control System, Vehicle Control Method, and Vehicle Control Program." The contents of this application are incorporated herein by reference in their entirety.

TECHNICAL FIELD

The present disclosure relates to a vehicle control system, a vehicle control method, and a vehicle control program.

BACKGROUND

A study of technology for automatically performing at least one of vehicle velocity control and vehicle steering control (such technology is hereinafter called automated driving) has recently been in progress. In relation to this, there is known a technique of letting a driver know the switching of the driving mode by controlling a reclining motor of a subject vehicle so that the reclining angle of a driver's seat in an automated driving mode may be larger than the reclining angle of the driver's seat in a manual driving mode (see International Patent Application Publication No. 2015/011866, for example).

SUMMARY

This existing technique refers to the relationship between whether automated driving is active and the reclining angle of the seat, but does not take into consideration the relationship between whether automated driving is active and an armrest.

Thus, it is desirable to provide a vehicle control system, a vehicle control method, and a vehicle control program capable of controlling an armrest suitably based on whether automated driving is active.

First aspect of the present embodiments provides a vehicle control system (100) including: a driving controller (120) configured to execute any one of automated driving for performing at least one of velocity control and steering control over a vehicle by executing any one of multiple driving modes having different automatic control levels, and manual driving for performing both of the velocity control and steering control over the vehicle based on operation on a main operator by an occupant of the vehicle; an armrest (89) for an occupant sitting on a driver's seat of the vehicle to put his/her arm on; and an armrest relative position controller (174) configured to control a drive unit (38) so that a position of the armrest relative to the occupant sitting on the driver's seat varies between the automated driving executed by the driving controller and the manual driving.

Second aspect is characterized in that, the armrest relative position controller controls the drive unit so that the armrest is located at a relative position where the armrest is usable when the automated driving is performed by the driving controller, and the armrest is located at a relative position where the armrest is hard to use when no automated driving is performed by the driving controller.

Third aspect is characterized in that, the drive unit drives the driver's seat in a longitudinal direction, the armrest is supported so as not to move in conjunction with longitudinal movement of the driver's seat, and the armrest relative position controller controls the drive unit to drive the driver's seat rearward, and thereby locate the armrest at a position ahead of the driver's seat and locate the armrest at a relative position where the armrest is usable.

Fourth aspect is characterized in that, the armrest is provided with an auxiliary operator (90) that is operable by the occupant sitting on the driver's seat, and the driving controller controls travel of the vehicle based on operation on the auxiliary operator according to which of the automated driving and the manual driving is active.

Fifth aspect is characterized in that, when the mode is switched from the automated driving to the manual driving, the driving controller controls the travel of the vehicle based on operation on the auxiliary operator.

Sixth aspect is characterized in that, the system further includes a display unit (70) configured to display information indicating that a driving operation on the auxiliary operator is possible.

Seventh aspect provides a vehicle control system including: a driving controller configured to perform switching control between automated driving for performing at least one of velocity control and steering control over a vehicle by executing any one of multiple driving modes having different automatic control levels, and manual driving for performing both of the velocity control and steering control over the vehicle based on operation on a main operator by an occupant of the vehicle; and an auxiliary operator operable by an occupant sitting on a driver's seat when the automated driving is executed by the driving controller.

Eighth aspect is characterized in that, when the mode is switched from the automated driving to the manual driving, the driving controller controls travel of the vehicle based on operation on the auxiliary operator.

Ninth aspect is characterized in that, the driver's seat is driven in a longitudinal direction by a drive unit, and the auxiliary operator is arranged on an armrest that is supported so as not to move in conjunction with longitudinal movement of the driver's seat, and becomes operable by the occupant sitting on the driver's seat when the driver's seat is driven rearward by the drive unit.

Tenth aspect provides a vehicle control method including causing an in-vehicle computer to execute any one of: automated driving for performing at least one of velocity control and steering control over a vehicle by executing any one of multiple driving modes having different automatic control levels; and manual driving for performing both of the velocity control and steering control over the vehicle based on operation on a main operator by an occupant of the vehicle, and control a drive unit so that a relative position of an armrest for an occupant sitting on a driver's seat of the vehicle to put his/her arm on varies between the automated driving and the manual driving.

Eleventh aspect provides a vehicle control program causing an in-vehicle computer to execute any one of: automated driving for performing at least one of velocity control and steering control over a vehicle by executing any one of multiple driving modes having different automatic control levels; and manual driving for performing both of the velocity control and steering control over the vehicle based on operation on a main operator by an occupant of the vehicle, and control a drive unit so that a relative position or an armrest for an occupant sitting on a driver's seat of the vehicle to put his/her arm on varies between the automated driving and the manual driving.

In the above explanation of the exemplary embodiment, specific elements with their reference numerals are indicated by using brackets. These specific elements are presented as mere examples in order to facilitate understanding, and thus, should not be interpreted as any limitation to the accompanying claims.

According to the first, seventh, tenth, eleventh aspects, for example, it is possible to control the armrest suitably based on whether automated driving is active.

According to the second aspect, for example, when automated driving of the vehicle is in operation, it is possible to move the armrest to a position where the armrest is easy to use for the occupant. On the other hand, when no automated driving is in operation, the armrest is moved to a position not interfering with the occupant, and thus the occupant can perform manual driving comfortably.

According to the third aspect, for example, it is possible to control the position of the armrest suitably by the movement of the driver's seat.

According to the fourth aspect, for example, the occupant of the driver's seat can control the travel of the vehicle using the auxiliary operator on the armrest even when the occupant is in a state of being incapable of operation with a main operator.

According to the fifth and eighth aspects, for example, at the timing of switching from automated driving to manual driving, the auxiliary operator can accept operation during the switching, which can smooth the transition of mode switching.

According to the ninth aspect, for example, the occupant of the vehicle can perform a driving operation easily with the auxiliary operator on the armrest.

DETAILED DESCRIPTION

Herein below, embodiments of the vehicle control system, the vehicle control method, and the vehicle control program according to the present disclosure are described with reference to the drawings.

First Embodiment

[Common Configuration]

Figure 1:
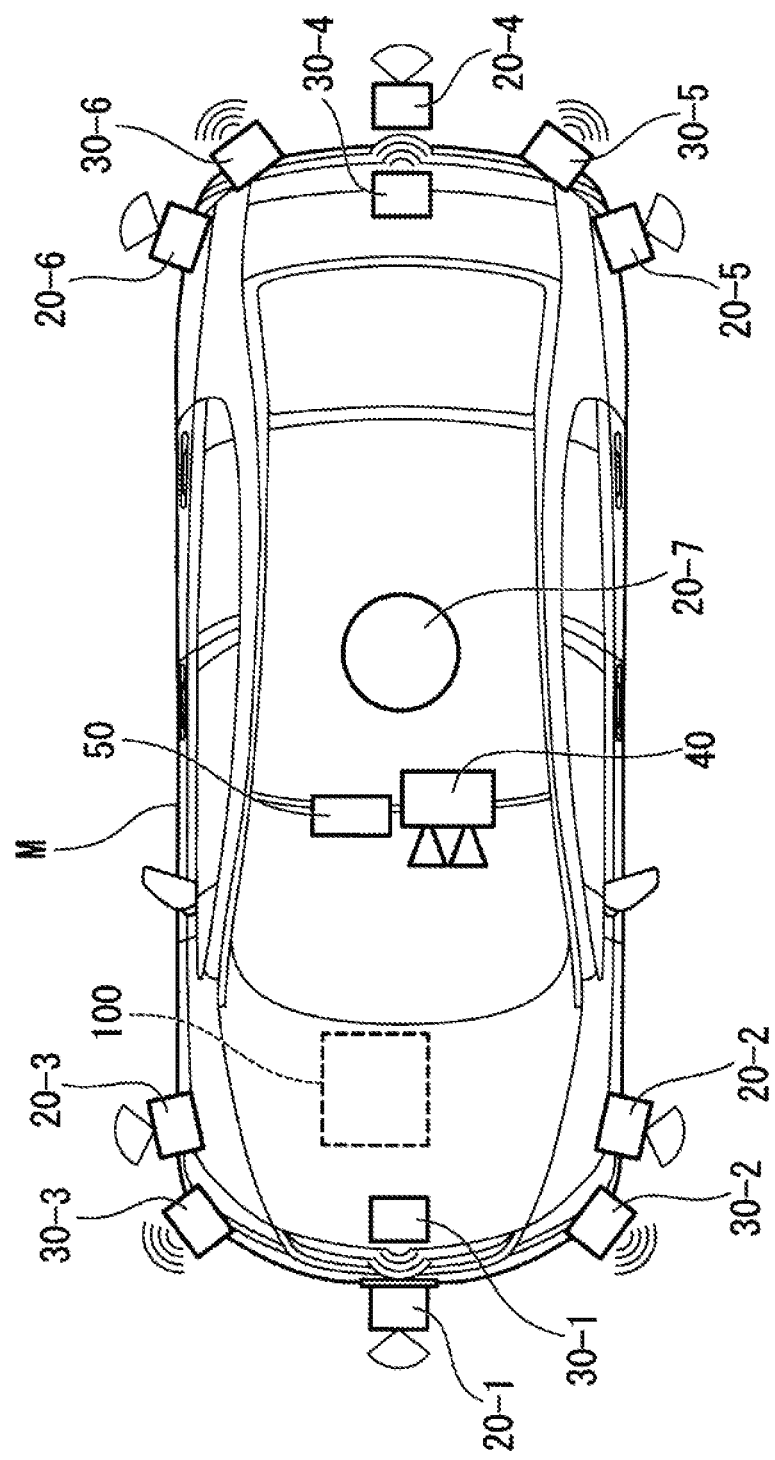
FIG. 1 is a view illustrating constituents of a vehicle equipped with a vehicle control system 100 according to embodiments of the present disclosure.

FIG. 1 is a view illustrating constituents of a vehicle (hereinafter called a subject vehicle M) equipped with a vehicle control system 100 according to the embodiments. The vehicle equipped with the vehicle control system 100 is a car such as a two-wheeled, three-wheeled, or a four-wheeled car, for example, and examples of such a car include: a car having an internal combustion engine such as a diesel engine or a gasoline engine as its power source; an electric vehicle having an electric motor as its power source; and a hybrid car having both an internal combustion engine and an electric motor. For example, the electric vehicle is driven by power discharged from a cell such as a secondary cell, a hydrogen fuel cell, a metal fuel cell, or an alcohol fuel cell.

As illustrated in FIG. 1, the subject vehicle M is equipped with: sensors including finders 20-1 to 20-7, radars 30-1 to 30-6, and a camera (imaging unit) 40; a navigation system 50; and the vehicle control system 100.

For example, each of the finders 20-1 to 20-7 is a Light Detection and Ranging or a Laser Imaging Detection and Ranging (LIDAR) configured to measure a distance to a target by measuring scattered light from illumination light. For example, the finder 20-1 is attached to a location such as a front grille, and the finders 20-2 and 20-3 are attached to locations such as side faces of a vehicle body, outside rearview mirrors, the inside of head lights, or the vicinity of side lights. The finder 20-4 is attached to a location such as a trunk lid, and the finders 20-5 and 20-6 are attached to locations such as side faces of the vehicle body or the inside of tail lights. The finders 20-1 to 20-6 each have a horizontal detection range of about 150 degrees, for example. Meanwhile, the finder 20-7 is attached to a location such as a roof. The finder 20-7 has a horizontal detection range of 360 degrees, for example.

For example, the radars 30-1 and 30-4 are long-distance millimeter-wave radars whose depthwise detection range is wider than that of other radars. Meanwhile, the radars 30-2, 30-3, 30-5, and 30-6 are middle-distance millimeter-wave radars whose depthwise detection range is narrower than that of the radars 30-1 and 30-4.

Hereinbelow, the finders 20-1 to 20-7 are simply stated as the "finders 20" unless they should be particularly distinguished from one another, and the radars 30-1 to 30-6 are simply stated as the "radars 30" unless they should be particularly distinguished from one another. The radars 30 are configured to detect an object by the Frequency Modulated Continuous Wave (FM-CW) method, for example.

For example, the camera 40 is a digital camera using a solid-state image pick up device such as a Charge Coupled Device (CCD) or a Complementary Metal Oxide Semiconductor (CMOS). The camera 40 is disposed at a location such as an upper part of a front windshield or a rear face of an inside rearview mirror. The camera 40 is configured to take an image of an area in front of the subject vehicle M periodically and repeatedly, for example. The camera 40 may be a stereoscopic camera having more than one camera.

Note that the configuration illustrated in FIG. 1 is merely an exemplary configuration, and thus a part of the configuration may be omitted and another configuration may be added.

Figure 2:
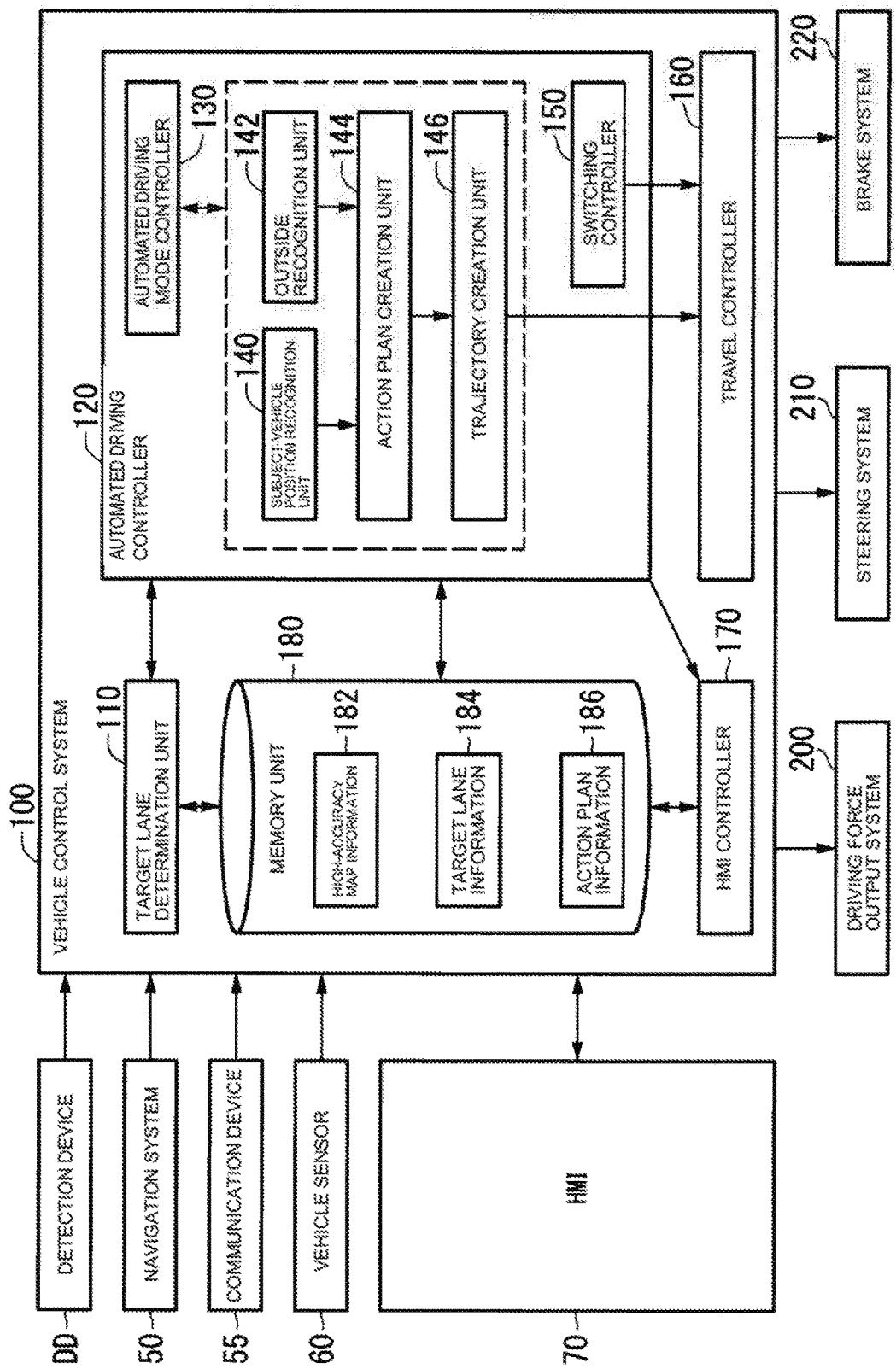
FIG. 2 is a functional block diagram centered on the vehicle control system 100.

FIG. 2 is a functional block diagram centered on the vehicle control system 100 according to the embodiments. The subject vehicle M is equipped with: a detection device DD including the finders 20, the radars 30, the camera 40, and the like; the navigation system (route guidance unit, display unit) 50; a communication device 55; a vehicle sensor 60; a Human Machine Interface (HMI) 70; the vehicle control system 100; a driving force output system 200; a steering system 210; and a brake system 220. These devices and instruments are connected to one another via a multiplex communication line such as a Controller Area Network (CAN) communication line, a serial communication line, a radio communication network, and the like. Note that the vehicle control system in the scope of claims does not necessarily indicate the "vehicle control system 100" only, but may include a configuration other than the vehicle control system 100 (at least one of the detection device DD, the navigation system 50, the communication device 55, the vehicle sensor 60, and the HMI 70, for example).

The navigation system 50 has: a Global Navigation Satellite System (GNSS) receiver; map information (navigation map); a touch panel display device acting as a user interface; a speaker; a microphone; and the like. The navigation system 50 is configured to estimate the position of the subject vehicle M with the GNSS receiver and derive a route from the estimated position to a destination designated by a vehicle occupant. The route thus derived by the navigation system 50 is provided to a target lane determination unit 110 of the vehicle control system 100. The position of the subject vehicle M may be estimated or complemented by the Inertial Navigation System (INS) that uses an output from the vehicle sensor 60. The navigation system 50 is also configured to guide the route to the destination by means of audio or navigation display. Here, the configuration for estimating the position of the subject vehicle M may be provided separately from the navigation system 50. In addition, the navigation system 50 may be implemented, for example, by the function of a terminal device such as a smartphone or a tablet terminal owned by the vehicle occupant. In this case, information is exchanged between the terminal device and the vehicle control system 100 through wired or wireless communication.

The communication device 55 is configured to perform radio communication using a cellular network, a Wi-Fi network, Bluetooth (registered trademark), and Dedicated Short Range Communication (DSRC), for example.

The vehicle sensor 60 includes sensors such as: a vehicle velocity sensor configured to detect a vehicle velocity; an acceleration sensor configured to detect acceleration; a yaw rate sensor configured to detect the angular velocity about the vertical axis; and a direction sensor configured to detect the direction of the subject vehicle M.

Figure 3:
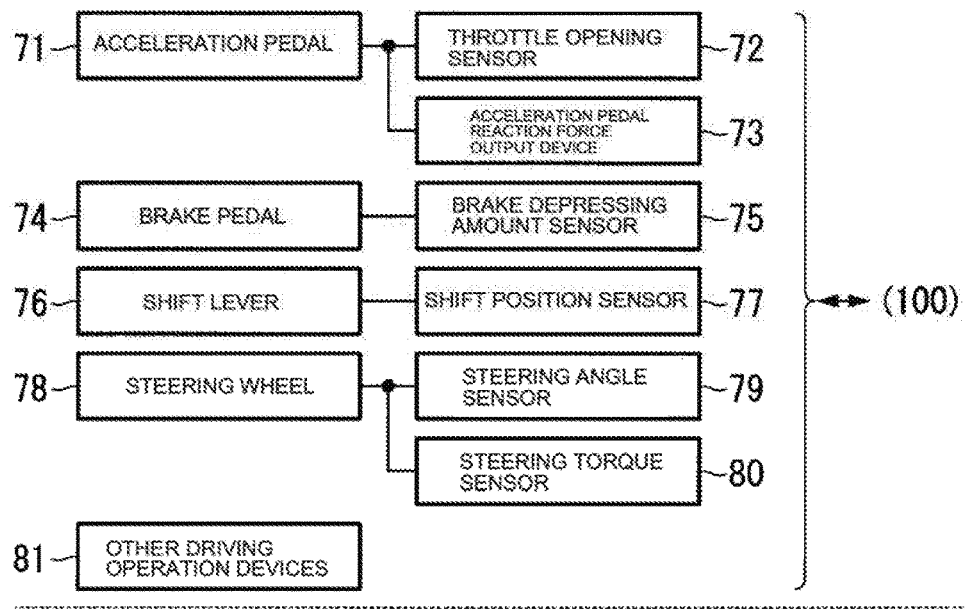
FIG. 3 is a block diagram of an HMI 70.
Figure 3:
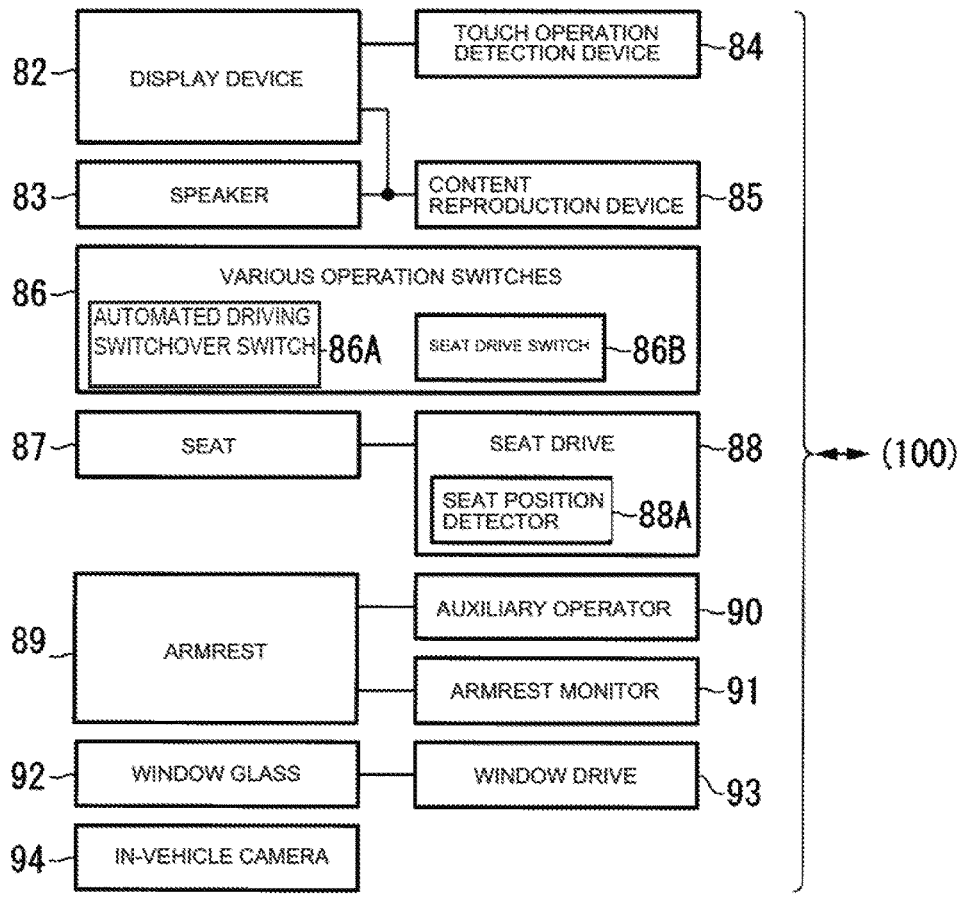

FIG. 3 is a block diagram of an HMI 70 in a first embodiment of the present disclosure. The HMI 70 has the configuration of a driving operation system and the configuration of a non-driving operation system, for example. These systems have no definite boundary, and the configuration of the driving operation system may have the function of the non-driving operation system (or vice versa). Here, a part of the HMI 70 is an example of an "operation acceptance unit" configured to accept instructions and selections from the vehicle occupant (occupant) of the subject vehicle, and also an example of an "output unit" configured to output information. The "output unit" includes a "display" for displaying an image.

As the configuration of the driving operation system, the HMI 70 includes, for example: an acceleration pedal 71; a throttle opening sensor 72; an acceleration pedal reaction force output device 73; a brake pedal 74; a brake depressing amount sensor (or master pressure sensor) 75; a shift lever 76; a shift position sensor 77; a steering wheel 78; a steering angle sensor 79; a steering torque sensor 80; and other driving operation devices 81.

The acceleration pedal 71 is a main operator for accepting acceleration instructions (or deceleration instructions along with a pedal release operation) from the vehicle occupant. The throttle opening sensor 72 is configured to detect the amount of depression of the acceleration pedal 71, and output a throttle opening signal, indicative of the amount of depression, to the vehicle control system 100. Here, the throttle opening sensor may output this signal to the driving force output system 200, the steering system 210, or the brake system 220 directly instead of outputting it to the vehicle control system 100. The same applies to the configuration of another driving operation system to be described below. The acceleration pedal reaction force output device 73 is configured to output a force in a direction opposite the direction in which the acceleration pedal is operated (operation reaction force) to the acceleration pedal 71 in response to instructions from the vehicle control system 100, for example.

The brake pedal 74 is a main operator for accepting deceleration instructions from the vehicle occupant. The brake depressing amount sensor 75 is configured to detect the amount of depression of the brake pedal 74 (or force with which the brake pedal is depressed), and output a brake signal, indicative of a detection result, to the vehicle control system 100.

The shift lever 76 is a main operator for accepting shift-stage change instructions from the vehicle occupant. The shift position sensor 77 is configured to detect the shift stage directed by the vehicle occupant, and output a shift position signal, indicative of a detection result, to the vehicle control system 100.

The steering wheel 78 is a main operator for accepting turning instructions from the vehicle occupant. The steering angle sensor 79 is configured to detect the operation angle of the steering wheel 78, and output a steering angle signal, indicative of a detection result, to the vehicle control system 100. The steering torque sensor 80 is configured to detect torque applied on the steering wheel 78, and output a steering torque signal, indicative of a detection result, to the vehicle control system 100.

Other driving operation devices 81 include a joystick, a button, a dial switch, and a Graphical User Interface (GUI) switch, for example. Other driving operation devices 81 are configured to accept instructions such as acceleration instructions, deceleration instructions, and turning instructions, and output them to the vehicle control system 100.

Meanwhile, as the configuration of the non-driving operation system, the HMI 70 includes, for example: a display device 82; a speaker 83; a touch operation detection device 84; a content reproduction device 85; various operation switches 86; a seat 87; a seat drive (drive unit) 88; an armrest 89; an auxiliary operator 90; an armrest monitor 91; a window glass 92; a window drive 93; and an in-vehicle camera (imaging unit) 94.

The display device 82 is, for example, a display device such as a Liquid Crystal Display (LCD) or an organic Electro Luminescence (EL) display device attached to a location such as part of an instrument panel or any desired location opposite a passenger's seat and back seats. For example, the display device 82 is a display located in front of the vehicle occupant who drives the subject vehicle M (hereinafter also referred to as the "driver" as needed). Alternatively, the display device 82 may be a Head Up Display (HUD) configured to project an image on a front windshield or another window, for example. The speaker 83 is configured to output audio. In the case where the display device 82 is a touch panel, the touch operation detection device 84 is configured to detect a touch position on a display screen of the display device 82, and output it to the vehicle control system 100. Here, no touch operation detection device 84 has to be provided in the case where the display device 82 is not a touch panel.

The display device 82 can output information, such as images, output from the navigation system 50, and can also output information, accepted from the vehicle occupant through the touch operation detection device 84, to the navigation system 50. Here, the display device 82 may have the same function as the navigation system 50, for example.

The content reproduction device 85 includes a Digital Versatile Disc (DVD) reproduction device, a Compact Disc (CD) reproduction device, a television receiver, and a device of creating various guidance images, for example. The content reproduction device 85 may reproduce information stored in a medium such as DVD and display the video on the display device 82 for example, or may reproduce information stored in an audio CD and output the audio through the speaker for example. Here, the display device 82, the speaker 83, the touch operation detection device 84, and the content reproduction device 85 described above may have a configuration partially or entirely shared with the navigation system 50. Besides, the navigation system 50 may be included in the HMI 70.

The various operation switches 86 are each placed at any desired position in the subject vehicle M. The various operation switches 86 include an automated driving switchover switch 86A and a seat drive switch 86B. The automated driving switchover switch 86A is a switch for giving instructions to start (immediately or in the future) and stop automated driving. The seat drive switch 86B is a switch for giving instructions to start and stop driving the seat drive 88. These switches may be any of a GUI switch and a mechanical switch. The various operation switches 86 may also include a switch for driving the window drive 93. Upon accepting operation from the vehicle occupant, the various operation switches 86 output the operation signal thus accepted to the vehicle control system 100.

The seat 87 is a seat for the vehicle occupant of the subject vehicle M to sit on, and is a seat capable of being driven electrically. The seat 87 includes, for example, a driver's seat on which an occupant sits for driving the subject vehicle M manually, the passenger's seat next to the driver's seat, and the back seats behind the driver's seat and the passenger's seat. Here, in the following description, the "seat 87" at least includes the driver's seat. The seat drive 88 is configured to drive, in response to operation on the seat drive switch 86B, a motor and the like to change parameters such as the reclining angle, longitudinal and vertical positions, and yaw angle (indicative of the turning angle) of the seat 87 freely at a predetermined velocity (at a velocity V0 for example). For example, the seat drive 88 can turn the driver's seat or the passenger's seat as the seat 87 so that it may be opposed to the back seats as the seat 87.

The seat drive 88 includes a seat position detector 88A configured to detect parameters such as the reclining angle, longitudinal and vertical positions, and yaw angle of the seat 87. The seat drive 88 outputs information, indicative of a detection result from the seat position detector 88A, to the vehicle control system 100.

The armrest 89 is a member for the vehicle occupant of the subject vehicle M to put his/her elbow or arm on. The armrest 89 is disposed at one or both of the right and left sides of the seat 87 of the subject vehicle M, for example. In addition, in the first embodiment, the armrest 89 is supported so as not to move in conjunction with or together with the movement of the seat 87 such as the driver's seat. Accordingly, by moving the seat 87, the seat drive 88 can vary the position of the armrest 89 relative to the vehicle occupant sitting on the seat 87 such as the driver's seat of the subject vehicle M between cases of automated driving executed by an automated driving controller 120 and manual driving, for example.

The auxiliary operator 90 is an auxiliary operator provided to the armrest 89. When at least one of the acceleration pedal 71, the brake pedal 74, the shift lever 76, and the steering wheel 78 described above acts as a main operator, for example, the auxiliary operator 90 enables the same operation as the main operator under predetermined conditions. In other words, at least one of velocity control and steering control over the subject vehicle M might be possible using the auxiliary operator 90.

For example, the auxiliary operator 90 may be one or more buttons, or alternatively may be a lever (joystick), arrow keys, dial keys, a sliding operator, or the like. Alternatively, the auxiliary operator 30 may be a GUI switch displayed on the armrest monitor 91 to be described below. Still alternatively, the auxiliary operator 90 may be provided on the armrest 89 detachably.

The armrest monitor 91 is a display unit provided on the armrest 89, and is a monitor for enabling a vehicle occupant P to recognize the outside of the subject vehicle M. The armrest monitor 91 displays thereon an image of the area in front of the subject vehicle M taken by the camera 40 or the like. For example, the armrest monitor 91 may be provided on the armrest 89 detachably. Alternatively, the armrest monitor 91 may be a touch panel display device. In this case, a GUI switch set on its screen may act as the auxiliary operator 90. Besides, the auxiliary operator 90 may be used for a purpose other than driving operation. For example, the auxiliary operator 90 may be used for various reproduction-related operations in the content reproduction device 85 such as content selection, reproduction, and stop operations, and operations in the navigation system 50 such as destination setting and route selection operations.

Figure 4A:
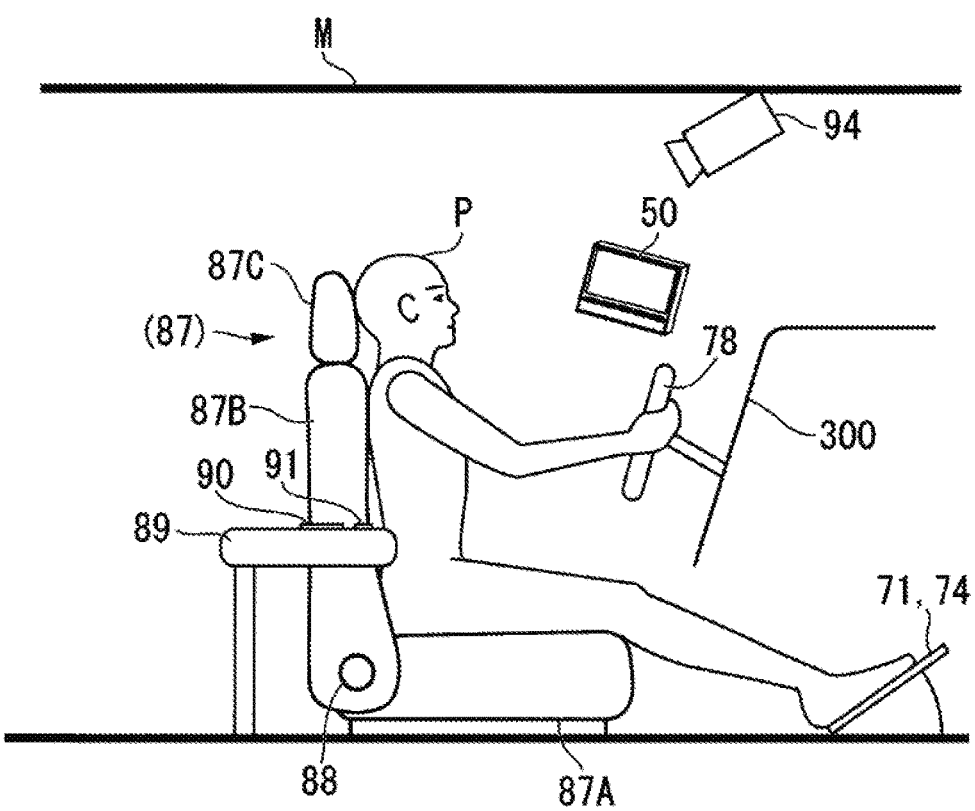
FIG. 4A and FIG. 4B are an explanatory view of operation examples using an auxiliary operator according to a first embodiment of the present disclosure.
Figure 4B:
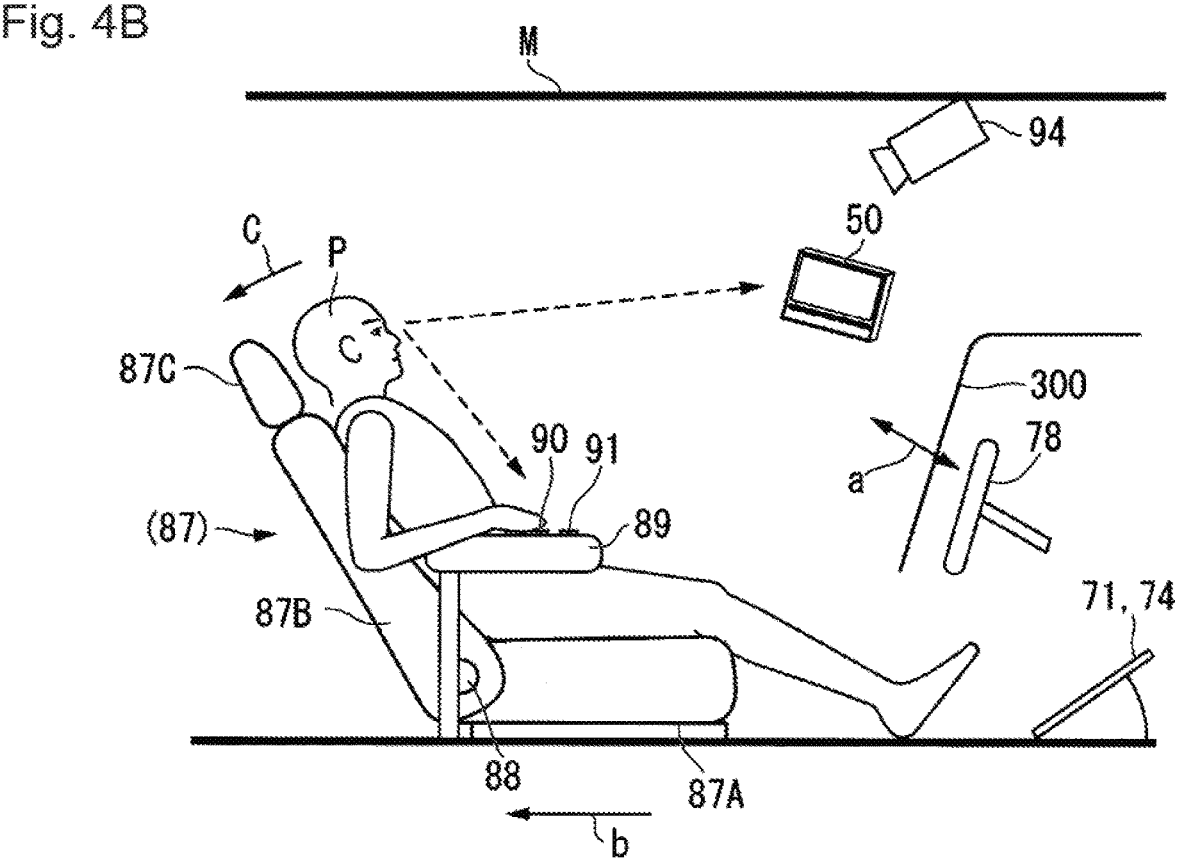

Hereinbelow, the relationship between the seat 87 and the armrest 89 according to the first embodiment is described with reference to FIGS. 4A, 4B. FIGS. 4A, 4B are an explanatory view of operation examples using the auxiliary operator according to the first embodiment. FIG. 4A is a view illustrating a layout example of the seat 87 and the armrest 89 in the case of the manual driving mode, and FIG. 4B is a view illustrating a layout example of the seat 87 and the armrest 89 in the case of the automated driving mode.

The example in FIGS. 4A, 4B illustrates a state where the vehicle occupant P of the subject vehicle M sits on the driver's seat as the seat 87. In addition, the example in FIGS. 4A, 4B illustrates, as an example of the main operator in the driving operation system of the HMI 70, the acceleration pedal 71 and the brake pedal 74 for allowing manual velocity control over the subject vehicle M, and the steering wheel 78 for allowing manual steering control over the subject vehicle M. The example in FIGS. 4A, 4B also illustrates, as an example of the non-driving operation system of the HMI 70, the navigation system 50, the seat 87, the armrest 89, and the in-vehicle camera 94.

The seat 87 illustrated in FIGS. 4A, 4B includes: a seat portion (seat cushion) 87A; a backrest portion (seat back) 87B; and a headrest 87C. For example, the seat drive 88 can detect parameters such as the longitudinal and vertical positions of the seat portion 87A and the angle formed by the seat portion 87A and the backrest portion 87B (reclining angle), and can also adjust these longitudinal and vertical positions and reclining angle. In addition, in the example in FIGS. 4A, 4B, the armrest 89 includes the auxiliary operator 90 and the armrest monitor 91. Note that the shapes and layouts of the configurations described above are not limited to these.

The armrest 89 according to the first embodiment is mounted on a floor in the vehicle compartment of the subject vehicle M. The armrest 89 is supported so as not to move in conjunction with the longitudinal movement of the driver's seat as the seat 87. The armrest 89 is not linked to the movement of the driver's seat.

Here, when the subject vehicle M is not in automated driving, for example, the armrest 89 is located at a position not interfering with operation on the main operator (e.g., the acceleration pedal 71, the brake pedal 74, the shift lever 76, and the steering wheel 78) by the vehicle occupant P, as illustrated in FIG. 4A. In other words, when the subject vehicle is not in automated driving, the position of the armrest 89 relative to the seat 87 is a position making it difficult for the occupant to use the armrest 89.

Meanwhile, in the case where the subject vehicle M is switched to the automated driving mode, some of the levels of the automated driving mode do not require the vehicle occupant P to drive the subject vehicle M manually. Thus, the main operator accepting operation from the vehicle occupant P may be stored, for example, in a predetermined location in this case. For example, in the example illustrated in part FIG. 4B, the steering wheel 78 is stored inside a garnish (such as a dashboard) 300 located in a front face part of the vehicle compartment of the subject vehicle M along with the start of the automated driving mode. The steering wheel 78 or the garnish 300 may be provided with a mechanism capable of moving the steering wheel 78 in the direction of arrow a illustrated in FIG. 4B. The control of storing the steering wheel 78 inside and putting it back to the original position described above is executed upon instructions from the vehicle control system 100.

In addition, since the vehicle occupant P needs no driving during automated driving, adjustment such as movement of the position of the driver's seat as the seat 87 and adjustment of the reclining angle of the driver's seat is made so that the vehicle occupant can take a comfortable posture. Here, in the example illustrated in FIG. 4B, during automated driving, the seat drive 88 moves the position of the driver's seat as the seat 87 by a predetermined distance toward a position at the rear of the position where the seat is located during manual driving (in the direction of arrow b). Moreover, in the example illustrated in part FIG. 4B, the seat drive widens the reclining angle by a predetermined angle toward a position at the rear of the position where the seat is located during manual driving (in the direction of arrow c). By controlling the seat drive 88 to drive the seat 87 rearward, it is possible to locate the armrest 89 at a position ahead of the seat 87 and locate the armrest 89 at a relative position where the armrest is usable. Here, as illustrated in FIG. 4B, the armrest 89 is located, for example, at the position of the vehicle occupant P's elbow or arm. In the above example, the seat drive 88 moves and varies the position of the driver's seat as the seat 87 in the longitudinal direction of the subject vehicle M between the case where the subject vehicle M is in automated driving and the case where the subject vehicle is not in automated driving; however, the longitudinal movement described above may be instead performed manually by the vehicle occupant P.

As described above, according to the example illustrated in FIGS. 4A, 4B, when the automated driving is performed by the vehicle control system 100, the position of the seat 87 is controlled so that the armrest 89 is located at a position relative to the seat where the armrest is usable; on the other hand, when no automated driving is performed, the position of the seat 87 is controlled so that the armrest 89 is located at a position relative to the seat where the armrest is hard to use.

In addition, in the first embodiment, the armrest 89 is provided with the auxiliary operator 90 (which may include the armrest monitor 91) operable by the vehicle occupant P sitting on the driver's seat as the seat 87. According to which of automated driving and manual driving is active in the subject vehicle M, the vehicle control system 100 controls the travel of the subject vehicle M based on operation on the auxiliary operator 90 or the like.

For example, when the subject vehicle M is switched from automated driving to manual driving, the vehicle control system 100 controls the travel of the subject vehicle M based on operation on the auxiliary operator 90. Thereby, at the timing of switching from automated driving to manual driving, the auxiliary operator 90 can accept operation during the switching, which can smooth the transition of mode switching.

Further, in the first embodiment, it is also possible to display, on the display unit such as the armrest monitor 91 or the navigation system 50, images taken toy the camera 40 and the like and information indicating that a driving operation on the auxiliary operator 90 is possible. This enables the vehicle occupant P to easily know that a driving operation can be made on the auxiliary operator 90. The vehicle occupant P can also perform velocity control or steering control over the subject vehicle M by operating the auxiliary operator 90 while looking at the armrest monitor 91 or the navigation system 50.

Referring back to FIG. 3, the window glass 92 is provided on each door, for example. The window drive 93 is configured to drive the window glass 92 to open and close.

The in-vehicle camera 94 is a digital camera using a solid-state image pick up device such as a CCD or a CMOS. The in-vehicle camera 94 is disposed at a location, such as the rearview mirror, a steering boss part, or the instrument panel, where the camera can take an image of at least a head part (including the face) of the vehicle occupant sitting on the seat 87. The in-vehicle camera 94 is configured to take an image of the vehicle occupant periodically and repeatedly.

Next, the vehicle control system 100 is described. Before the description of the vehicle control system 100, the driving force output system 200, the steering system 210, and the brake system 220 are described.

The driving force output system 200 is configured to output driving force (torque), generated for the vehicle to travel, to driving wheels. For example, in the case where the subject vehicle M is a car having an internal combustion engine as its power source, the driving force output system 200 includes an engine, a transmission, and an engine Electronic Control Unit (ECU) configured to control the engine; in the case where the subject vehicle M is an electric vehicle having an electric motor as its power source, the driving force output system includes a driving motor and a motor ECU configured to control the driving motor; and in the case where the subject vehicle M is a hybrid car, the driving force output system includes an engine, a transmission, an engine ECU, a driving motor, and a motor ECU. In the case where the driving force output system 200 includes the engine only, the engine ECU adjusts parameters such as the throttle opening of the engine and the shift stage according to information input from a travel controller 160 to be described below. In the case where the driving force output system 200 includes the driving motor only, the motor ECU adjusts the duty ratio of a PWM signal to be fed to the driving motor according to information input from the travel controller 160. In the case where the driving force output system 200 includes both the engine and the driving motor, the engine ECU and the motor ECU control the driving force in concert with each other according to information input from the travel controller 160.

The steering system 210 includes a steering ECU and an electric motor, for example. The electric motor is configured to change the direction of turned wheels by applying force to a rack and pinion mechanism, for example. The steering ECU is configured to drive the electric motor to change the direction of the turned wheels according to information input from the vehicle control system 100 or input information on steering angle or steering torque.

The brake system 220 is an electric servo brake system including, for example: a brake caliper; a cylinder designed to transmit hydraulic pressure to the brake caliper; an electric motor configured to generate hydraulic pressure in the cylinder; and a braking controller. The braking controller of the electric servo brake system is configured to control an electric motor according to information input from the travel controller 160 so that brake torque corresponding to braking operation can be output to each wheel. The electric servo brake system may include, as its backup, a mechanism configured to transmit hydraulic pressure, generated in response to operation on the brake pedal, to the cylinder through a master cylinder. Here, the brake system 220 is not limited to the electric servo brake system described above but may be an electronically controlled hydraulic brake system. The electronically controlled hydraulic brake system is configured to control an actuator according to information input from the travel controller 160 and transmit the hydraulic pressure of the master cylinder to the cylinder. In addition, the brake system 220 may include a regenerative brake, operated by the driving motor, which can be included in the driving force output system 200.

[Vehicle Control System]

Hereinbelow, the vehicle control system 100 is described. The vehicle control system 100 is implemented, for example, by one or more processors or hardware having the equivalent function. The vehicle control system 100 may have a configuration where an Electronic Control Unit (ECU) or a Micro-Processing Unit (MPU), made by connecting a processor such as a Central processing Unit (CPU), a memory, and a communication interface are connected to one another through internal buses, and the like are combined together.

Referring back to FIG. 2, the vehicle control system 100 includes, for example: the target lane determination unit 110; the automated driving controller (driving controller) 120; the travel controller 160; an HMI controller 170; and a memory unit 180. The automated driving controller 120 includes, for example: an automated driving mode controller 130; a subject-vehicle position recognition unit 140; an outside recognition unit 142; an action plan creation unit 144; a trajectory creation unit 146; and a switching controller 150.

The target lane determination unit 110, the units of the automated driving controller 120, the travel controller 160, and the HMI controller 170 are partially or entirely implemented by causing a processor to execute a program (software). Alternatively, these units may be partially or entirely implemented by hardware such as a Large Scale Integration (LSI) or Application Specific Integrated Circuit (ASIC), or may be implemented by a combination of software and hardware.

For example, information such as high-accuracy map information 182, target lane information 184, action plan information 186 is stored in the memory unit 180. The memory unit 180 is implemented by a Read Only Memory (ROM), a Random Access Memory (RAM), a Hard Disk Drive (HDD), a flash memory, and the like. The program executed by the processor may be stored in the memory unit 180 in advance, or instead may be downloaded from an external device via an in-vehicle internet facility for example. Alternatively, the program may be installed in the memory unit 180 by attaching a portable storage medium storing the program therein to a drive device (not illustrated). Further, a computer (in-vehicle computer) of the vehicle control system 100 may be implemented by multiple distributed computer devices.

The target lane determination unit 110 is implemented by an MPU, for example. The target lane determination unit 110 is configured to divide a route provided by the navigation system 50 into multiple blocks (divide the route at an interval of 100 [m] in a vehicle travel direction, for example), and determine a target lane for each block with reference to the high-accuracy map information 182.

In addition, the target lane determination unit 110 is configured to judge, for each of the above blocks of the route provided by the navigation system 50 for example, whether automated driving is applicable to the block. For example, the target lane determination unit 110 determines which lane from the left the subject vehicle M will travel in a section where the subject vehicle can travel in the automated driving mode under control of the automated driving controller 120. The section where the vehicle can travel in the automated driving mode can be set based on, for example, the positions of the entrance and exit (ramp, interchange), a toll gate, and the like of an expressway and the shape of a road (a straight line equal to or longer than a predetermined distance). The section where the vehicle can travel in the automated driving mode is a section where the vehicle travels on an expressway, for example, but is not limited to this.

Here, the target lane determination unit 110 may display a section where automated driving is applicable as a candidate section where the vehicle occupant can select whether automated driving is needed or not, when the section in question is equal to or longer than the predetermined distance. This can free the vehicle occupant from the burden of having to check whether automated driving is needed even in a section where automated driving is applicable for a short distance only, for example. Note that the processes described above may be carried out either by the target lane determination unit 110 or the navigation system 50.

In the case where there is a branching point, a merging point, or the like on the travel route, for example, the target lane determination unit 110 determines the target lane so that the subject vehicle M can travel on a travel route reasonable for advancing toward its branching destination. The target lane thus determined by the target lane determination unit 110 is stored in the memory unit 180 as the target lane information 184.

The high-accuracy map information 182 is map information more accurate than navigation map included in the navigation system 50. The high-accuracy map information 182 includes, for example, information on the center of a lane or information on a boundary between lanes. The high-accuracy map information 132 may also include information such as road information, traffic regulation information, address information (address and zip code), facility information, and phone number information. The road information includes information on the type of the road such as an expressway, a toll road, a national road, and a prefectural road, and information on the number of lanes of the road, the width of each lane, the inclination of the road, the position of the road (three-dimensional coordinates including the longitude, latitude, and height), the curvature of the curve of each lane, the positions of the merging point and branching point of the lanes, signs on the road, and the like. The traffic regulation information may include information on the fact that the lanes are being closed due to reasons such as construction work, traffic accident, or traffic congestion.

In addition, when the target lane determination unit 110 acquires travel route candidate information from the navigation device 50, it acquires information on the section where the vehicle travels in the automated driving mode from the automated driving controller 120 with reference to the high-accuracy map information 182, and outputs the acquired information to the navigation system 50. Further, when the navigation system 50 fixes the route to destination and automated driving section, the target lane determination unit 110 creates target lane information 184 corresponding to this route and automated driving section and stores them in the memory unit 180.

The automated driving controller 120 is configured to perform at least one of velocity control and steering control over the subject vehicle M automatically by executing any one of multiple driving modes having different automatic control levels, for example. Here, the velocity control is control on acceleration/deceleration of the subject vehicle M, for example, and the acceleration/deceleration includes one or both of acceleration and deceleration. In addition, in response to operation accepted by the operation acceptance unit such as the HMI 70, for example, the automated driving controller 120 controls manual driving in which the vehicle occupant of the subject vehicle M performs both the velocity control and steering control over the subject vehicle M based on operation on the operator such as the main operator or the auxiliary operator.

For example, according to which of automated driving and manual driving is active in the subject vehicle M, the automated driving controller 120 controls the travel of the subject vehicle based on operation on the main operator or the auxiliary operator 90. For example, when the vehicle is switched from automated driving to manual driving, the automated driving controller 120 controls the travel of the subject vehicle M based on operation on the auxiliary operator 90.

The automated driving mode controller 130 is configured to determine the automated driving mode to be executed by the automated driving controller 120. The automated driving mode in this embodiment includes the following modes. Note that the following modes are merely exemplary, and the number of automated driving modes may be determined as desired.

[Mode A]

Mode A is a mode with the highest automatic control level. When mode A is in operation, all kinds of vehicle control including complicated merging control are performed automatically, and thus the vehicle occupant does not need to monitor the periphery and state of the subject vehicle M (no periphery monitoring obligation is applied).

[Mode B]

Mode B is a mode with the second highest automatic control level next to mode A. When mode B is in operation, all kinds of vehicle control are performed automatically in principle, but in some cases the driving operation of the subject vehicle M is left to the vehicle occupant. Hence, the vehicle occupant needs to monitor the periphery and state of the subject vehicle M (the periphery monitoring obligation is applied).

[Mode C]

Mode C is a mode with the third highest automatic control level next to mode B. When mode C is in operation, the vehicle occupant needs to perform a check operation on the HMI 70 depending on the situation. In mode C, automatic lane change is performed, for example, when the vehicle occupant is notified of the lane change timing and performs an operation of lane change instructions on the HMI 70. Hence, the vehicle occupant needs to monitor the periphery and state of the subject vehicle M (the periphery monitoring obligation is applied). Here, the mode with the lowest automatic control level in this embodiment may be, for example, the manual driving mode in which no automated driving is performed and both the velocity control and steering control over the subject vehicle M are performed based on operation on the subject vehicle M by the vehicle occupant. In the manual driving mode, needless to say, the periphery monitoring obligation is applied to the driver.

The automated driving mode controller 130 determines the automated driving mode based on operation made on the HMI 70 by the vehicle occupant, the event determined by the action plan creation unit 144, and the travel mode determined by the trajectory creation unit 146, for example. The HMI controller 170 is notified of this automated driving mode. In addition, a limitation may be set for the automated driving mode according to the performance of the detection device DD of the subject vehicle M, for example. When the performance of the detection device DD is poor, for example, mode A may be set inactive. In either mode, switching to the manual driving mode (override) is possible by operation on the configuration of the driving operation system in the HMI 70.

The subject-vehicle position recognition unit 140 is configured to recognize the lane the subject vehicle M is traveling (travel lane) and the position of the subject vehicle M relative to the travel lane based on the high-accuracy map information 182 stored in the memory unit 180 and the information input from the finders 20, the radars 30, the camera 40, the navigation system 50, or the vehicle sensor 60.

The subject-vehicle position recognition unit 140 recognizes the travel lane by, for example, comparing a pattern of road compartment lines (e.g., an array of solid lines and broken lines) that can be recognized from the high-accuracy map information 182 with a pattern of road compartment lines in the periphery of the subject vehicle M that can be recognized from images taken by the camera 40. Here, the position of the subject vehicle M acquired from the navigation system 50 and a process result of the INS may also be taken into consideration for this recognition.

Figure 5:
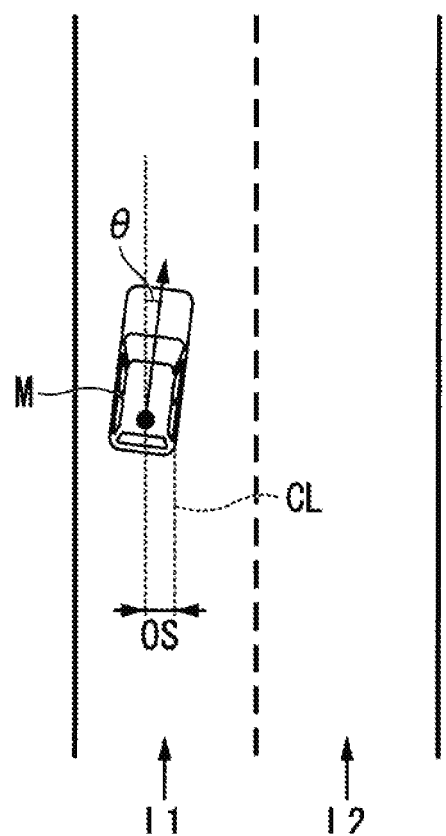
FIG. 5 is a view illustrating how the position of a subject vehicle M relative to a travel lane L1 is recognized by a subject-vehicle position recognition unit 140.

FIG. 5 is a view illustrating how the position of the subject vehicle M relative to a travel lane L1 is recognized by the subject-vehicle position recognition unit 140. For example, the subject-vehicle position recognition unit 140 recognizes parameters, such as a divergence OS of a reference point of the subject vehicle M (such as the center of gravity) from a travel lane center CL and an angle θ between the travel direction of the subject vehicle M and the travel lane center CL, as the position of the subject vehicle M relative to the travel lane L1. Here, the subject-vehicle position recognition unit 140 may instead recognize parameters, such as the position of the reference point of the subject vehicle M relative to any one of side end parts of the travel lane L1, as the position of the subject vehicle M relative to the travel lane. The relative position of the subject vehicle M recognized by the subject-vehicle position recognition unit 140 is provided to the target lane determination unit 110.

The outside recognition unit 142 is configured to recognize the state of a peripheral vehicle, such as the position, velocity, and acceleration thereof, based on information input from the finders 20, the radars 30, the camera 40, and the like. The peripheral vehicle is a vehicle traveling at the periphery of the subject vehicle M and traveling in the same direction as the subject vehicle M. The position of the peripheral vehicle may be indicated by representative points such as the center of gravity and corners of this vehicle, or alternatively may be indicated by an area represented by the outline of this vehicle. The "state" of the peripheral vehicle may include the acceleration of the peripheral vehicle and whether or not the peripheral vehicle is changing lanes (or whether or not the peripheral vehicle is going to change lanes) that can be kept track of based on information from the above instruments. In addition to the peripheral vehicle, the outside recognition unit 142 may also recognize the positions of a guard rail, a power pole, a parked vehicle, a pedestrian, a falling object, a railroad crossing, a traffic light, a sign disposed near a place such as a construction site, and other objects.

The action plan creation unit 144 is configured to set a start point of automated driving and/or a destination of automated driving. The start point of automated driving may be a current position of the subject vehicle M or alternatively may be a point where an operation of automated driving instruction is made. The action plan creation unit 144 is configured to create an action plan in a section between the start point and the destination of automated driving. Here, in addition to the above section, the action plan creation unit 144 may create an action plan in any section.

The action plan is composed of multiple events executed in series, for example. The events include, for example: a deceleration event for decelerating the subject vehicle M; an acceleration event for accelerating the subject vehicle M; a lane keeping event for letting the subject vehicle M travel inside the travel lane; a lane change event for changing the travel lane; a passing event for letting the subject vehicle M pass a vehicle traveling in front of it; a branching event for letting the subject vehicle M change the lane to a desired lane or travel inside the current travel lane at a branching point; a merging event for letting the subject vehicle M accelerate and change the travel lane in a merging lane for merging with a main lane; and a handover event for letting the vehicle transition from the manual driving mode to the automated driving mode at an automated driving start point or transition from the automated driving mode to the manual driving mode at a planned automated driving end point.

The action plan creation unit 144 sets the lane change event, the branching event, or the merging event at a location where the target lane determined by the target lane determination unit 110 is switched. Information indicating the action plan created by the action plan creation unit 144 is stored in the memory unit 180 as the action plan information 186.

Figure 6:
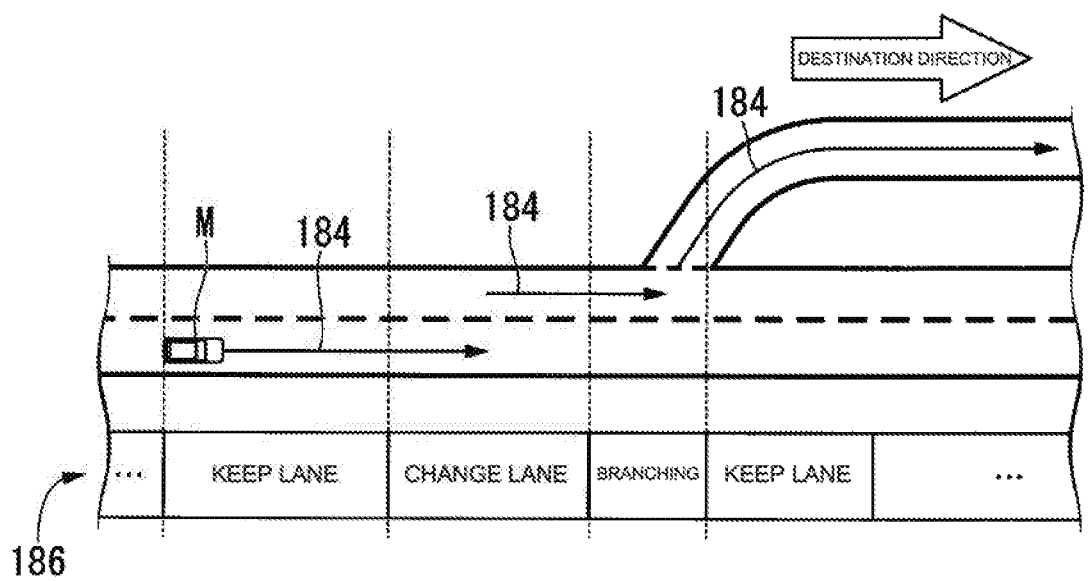
FIG. 6 is a view illustrating an example of an action plan created for a certain zone.

FIG. 6 is a view illustrating an example of an action plan created for a certain zone. As illustrated in the drawing, the action plan creation unit 144 creates an action plan required for the subject vehicle M to travel on the target lane designated by the target lane information 184. Here, the action plan creation unit 144 may dynamically change the action plan irrespectively of the target lane information 184 according to the change of situation of the subject vehicle M. For example, when the velocity of a peripheral vehicle recognized by the outside recognition unit 142 during travel of the vehicle exceeds a threshold or when the movement direction of a peripheral vehicle traveling on a lane next to the lane of the subject vehicle M is changed toward the lane of the subject vehicle, the action plan creation unit 144 changes the event set for a driving section the subject vehicle is scheduled to travel. For example, when event setting is made so that the lane change event is executed after the lane keeping event and if it turns out from a recognition result of the outside recognition unit 142 that a vehicle on the change destination lane is approaching from behind at a velocity equal to or higher than a threshold during the lane keeping event, the action plan creation unit 144 may change the event coming after the lane keeping event from the lane change event to another event such as the deceleration event or the lane keeping event. Thereby, the vehicle control system 100 can make the subject vehicle M automatically travel safely even when there is a change in outside situation.

Figure 7:
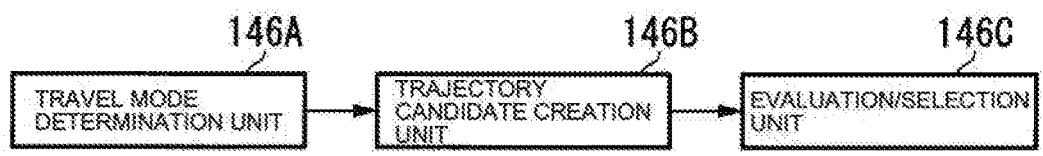
FIG. 7 is a diagram illustrating an example of the configuration of a trajectory creation unit 146.

FIG. 7 is a diagram illustrating an example of the configuration of the trajectory creation unit 146. For example, the trajectory creation unit 146 includes: a travel mode determination unit 146A; a trajectory candidate creation unit 146B; and an evaluation/selection unit 146C.

The travel mode determination unit 146A is configured to determine, when executing the lane keeping event for example, the travel mode among modes such as constant-velocity travel, tracking travel, low-velocity tracking travel, deceleration travel, curve travel, and obstacle avoidance travel. For example, when no other vehicle exists in front of the subject vehicle M, the travel mode determination unit 146A determines to set the travel mode to the constant-velocity travel. Meanwhile, when the subject vehicle tracks a vehicle traveling in front of it, the travel mode determination unit 146A determines to set the travel mode to the tracking travel. Meanwhile, in the case of situations such as traffic congestion, the travel mode determination unit 146A determines to set the travel mode to the low-velocity tracking travel. Meanwhile, when deceleration of a vehicle traveling in front of the subject vehicle is recognized by the outside recognition unit 142 or when the subject vehicle executes an event such as the stopping or parking of the vehicle, the travel mode determination unit 146A determines to set the travel mode to the deceleration travel. Meanwhile, when an event that the subject vehicle M approaches a curve is recognized by the outside recognition unit 142, the travel mode determination unit 146A determines to set the travel mode to the curve travel. Meanwhile, when an obstacle in front of the subject vehicle M is recognized by the outside recognition unit 142, the travel mode determination unit 146A determines to set the travel mode to the obstacle avoidance travel.

Figure 8:
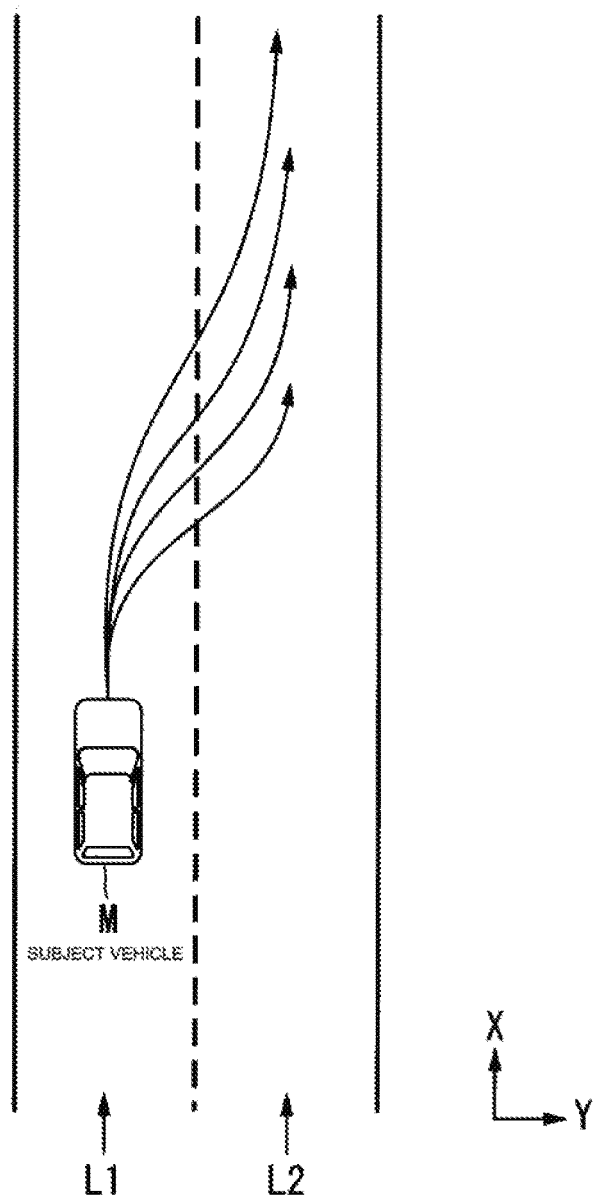
FIG. 8 is a view illustrating an example of trajectory candidates created by a trajectory candidate creation unit 146B.

The trajectory candidate creation unit 146B is configured to create trajectory candidates based on the travel mode determined by the travel mode determination unit 146A. FIG. 8 is a view illustrating an example of the trajectory candidates created by the trajectory candidate creation unit 146B. FIG. 8 illustrates the trajectory candidates created when the subject vehicle M changes lanes from L1 to L2.

Figure 9:
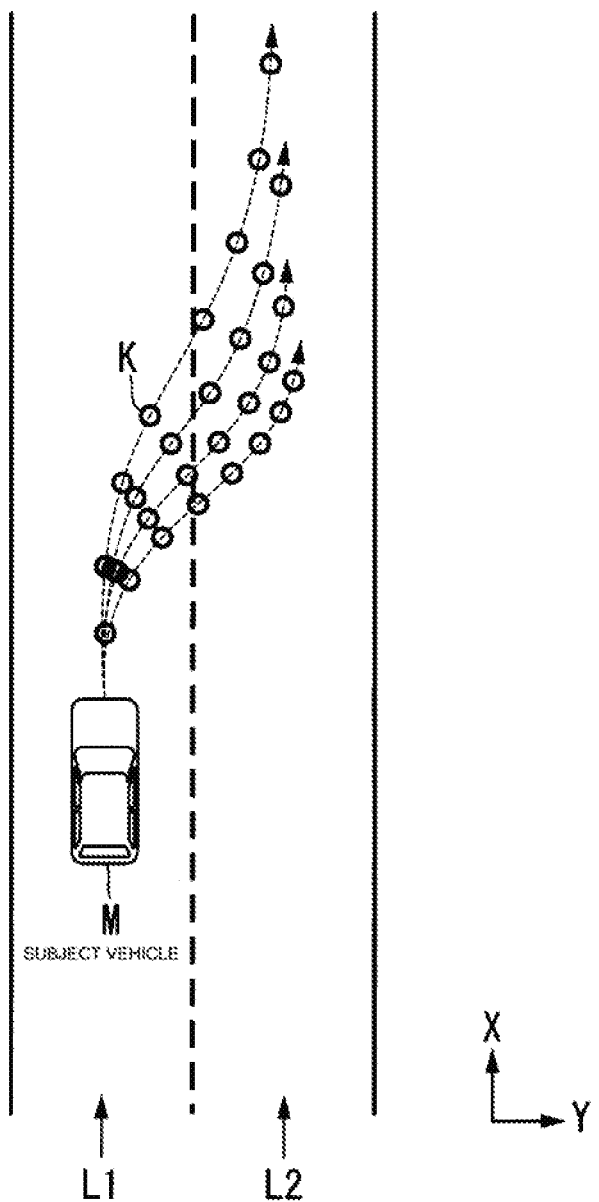
FIG. 9 is a view illustrating, with trajectory points K, trajectory candidates created by the trajectory candidate creation unit 146B.

The trajectory candidate creation unit 146B determines trajectories as illustrated in FIG. 8 for every predetermined time interval as a group of target positions (trajectory points K) at which a reference position of the subject vehicle M (such as the center of gravity or the center of the axis of rear wheels) should arrive. FIG. 9 is a view illustrating, with the trajectory points K, the trajectory candidates created by the trajectory candidate creation unit 146B. The velocity of the subject vehicle M increases as the interval between the trajectory points K becomes wider, and decreases as the interval between the trajectory points K becomes narrower. Thus, the trajectory candidate creation unit 146B widens the interval between the trajectory points K gradually in the case of acceleration, and narrows the interval between the trajectory points gradually in the case of deceleration.

Since each trajectory point K includes a component of velocity, the trajectory candidate creation unit 146B needs to provide each trajectory point K with a target velocity. The target velocity is determined by the travel mode determination unit 146A according to the travel mode.

Here, a target velocity determination method in the case of lane change (including branching) is described. First, the trajectory candidate creation unit 146B sets a lane change target position (or a merging target position). The lane change target position is set as a position relative to peripheral vehicles, and is used to determine "between which peripheral vehicles the subject vehicle is to cut in when changing lanes". The trajectory candidate creation unit 146B focuses attention on three peripheral vehicles located around the lane change target position, and determines the target velocity in the case of lane change.

Figure 10:
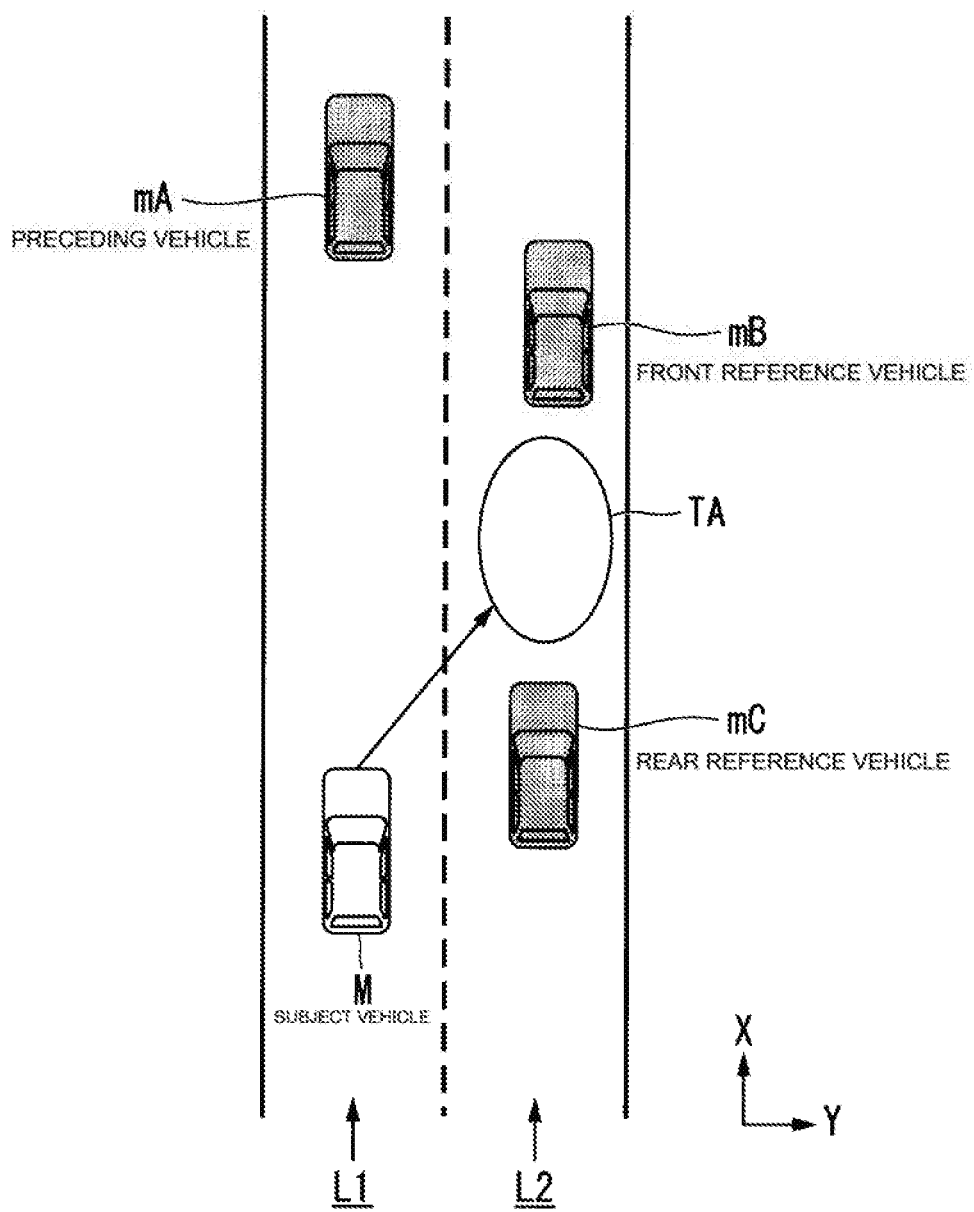
FIG. 10 is a view illustrating a lane change target position TA.

FIG. 10 is a view illustrating a lane change target position TA. In the drawing, reference numeral L1 denotes the lane of the subject vehicle and reference numeral L2 denotes a lane next to the lane of the subject vehicle. Here, a preceding vehicle mA is defined as a peripheral vehicle traveling on the same lane as the subject vehicle M and immediately in front of the subject vehicle M, a front reference vehicle mB is defined as a peripheral vehicle traveling immediately in front of the lane change target position TA, and a rear reference vehicle mC is defined as a peripheral vehicle traveling immediately behind the lane change target position TA. The subject vehicle M needs to accelerate or decelerate to move to the side of the lane change target position TA, but at the same time needs to avoid catching up with the preceding vehicle mA. For this reason, the trajectory candidate creation unit 146B estimates the future state of the three vehicles and determines the target velocity so as not to interfere with the peripheral vehicles.

Figure 11:
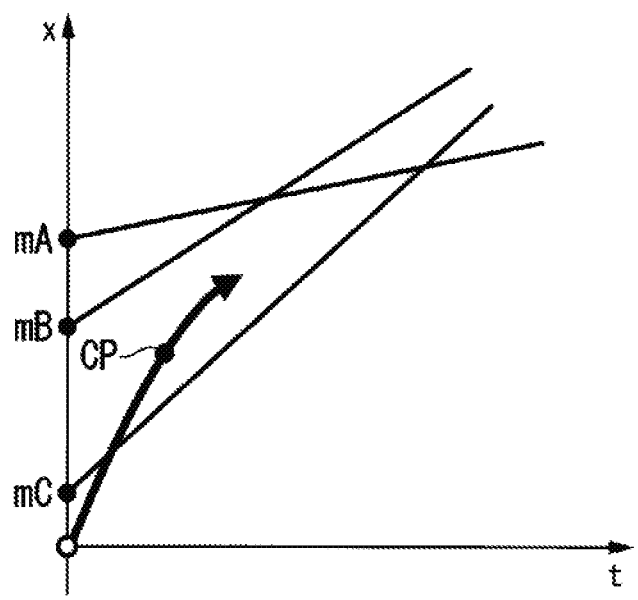
FIG. 11 is a chart illustrating a velocity model created based on an assumption that the velocities of three peripheral vehicles are constant.

FIG. 11 is a chart illustrating a velocity model created based on an assumption that the velocities of the three peripheral vehicles are constant. In the drawing, straight lines extending from mA, mB, and mC represent their displacements in the travel direction when it is assumed that the peripheral vehicles travel at constant velocities. The subject vehicle M has to be located between the front reference vehicle mB and the rear reference vehicle mC at a lane change completion point CP, and at the same time has to be located behind the preceding vehicle mA before this point. Under such restrictions, the trajectory candidate creation unit 146B derives multiple chronological patterns of target velocities in a period until completion of the lane change. Then, the trajectory candidate creation unit derives multiple trajectory candidates as illustrated in FIG. 8 above by applying the chronological target velocity patterns to a model such as a spline curve model. Here, the movement patterns of the three peripheral vehicles do not necessarily have to be a constant-velocity pattern as illustrated in FIG. 11, but may be estimated based on constant acceleration or constant jerk.

The evaluation/selection unit 146C is configured to evaluate the trajectory candidates, created by the trajectory candidate creation unit 146B, in terms of two perspectives i.e. planning and safety, for example, and select a trajectory to be output to the travel controller 160. In terms of planning, a trajectory with good evaluation is one which has high trackability with respect to the already created plan (such as the action plan) and whose entire length is short, for example. For example, when lane change to the right is requested, a trajectory such as changing lanes to the left once and then going back results in poor evaluation. In terms of safety, better evaluation is given to a trajectory in which the distance between the subject vehicle M and an object (such as a peripheral vehicle) is larger at every trajectory point and whose acceleration/deceleration, amount of variation of steering angle, and the like are smaller.

The switching controller 150 is configured to switch the mode between the automated driving mode and the manual driving mode based on a signal input through the automated driving switchover switch 86A for example. The switching controller 150 switches the driving mode teased on an acceleration, deceleration, or steering instruction operation given to the driving operation system of the HMI 70. The switching controller 150 is also configured to perform handover control for shifting the mode from the automated driving mode to the manual driving mode at a location such as the vicinity of a scheduled automated driving mode end point set in the action plan information 186 for example.

The travel controller 160 is configured to control the driving force output system 200, the steering system 210, and the brake system 220 so that the subject vehicle M can pass through the travel trajectory, created (scheduled) by the trajectory creation unit 146, on schedule.

The HMI controller 170 is configured to control, upon input of information on the switching of the driving mode from the automated driving controller 120, the HMI 70 and the like according to the input information.

Figure 12:
FIG. 12 is a diagram illustrating a functional configuration example of an HMI controller 170.

FIG. 12 is a diagram illustrating a functional configuration example of the HMI controller 170. The HMI controller 170 illustrated in FIG. 12 includes: a state judgment unit 172; an armrest relative position controller 174; and an operator switching unit 176.

The state judgment unit 172 is configured to judge whether or not it is ok to make the armrest 89 usable to the vehicle occupant of the subject vehicle M by letting it stick out. For example, the state judgment unit 172 judges that it is ok to make the armrest 89 usable to the vehicle occupant when the driving mode acquired from the automated driving controller 120 is any of modes A to C above which are the automated driving mode. On the other hand, the state judgment unit 172 judges that it is problematic to make the armrest 89 usable to the vehicle occupant when the driving mode acquired from the automated driving controller 120 is the manual driving mode.

The armrest relative position controller 174 is configured to control the seat drive 88 so that the position of the armrest 89 relative to the vehicle occupant sitting on the driver's seat as the seat 87 varies between automated driving executed by the automated driving controller 120 and manual driving. For example, when the state judgment unit 172 judges that it is ok to make the armrest 89 usable to the vehicle occupant of the subject vehicle M by letting it stick out (when automated driving is performed by the automated driving controller 120, for example), the armrest relative position controller 174 controls the seat drive 88 so that the armrest 89 may be located at a relative position where the armrest is usable as illustrated in FIG. 4B above. For example, by controlling the seat drive 88 so that the driver's seat as the seat 87 is driven rearward, the armrest relative position controller 174 locates the armrest 89 at a position ahead of the seat 87 and locate the armrest 89 at a relative position where the armrest is usable.

On the other hand, when the state judgment unit 172 judges that it is problematic to make the armrest 89 usable to the vehicle occupant (when no automated driving is performed by the automated driving controller 120), the armrest relative position controller 174 controls the seat drive 88 so that the armrest 89 may toe located at a position where the armrest is hard to use as illustrated in FIG. 4A above.

The operator switching unit 176 is configured to switch whether to accept operation made with the main operator and the auxiliary operator. For example, when the armrest 89 is in a usable state, the operator switching unit 176 accepts operation made with the auxiliary operator 90 placed on the armrest 89. Here, in a state where the vehicle occupant can operate the main operator, the operator switching unit 176 may accept only operation on the main operator or temporarily accept operation on both operators instead.

For example, the operator switching unit 176 outputs the content that it has accepted through the operator after the switching (the main operator and auxiliary operator) to at least one of the driving force output system 200, the steering system 210, and the brake system 220 to perform velocity control and steering control over the subject vehicle M. In addition, the operator switching unit 176 may notify, through the HMI 70 (output unit), the vehicle occupant of which of the main operator and the auxiliary operator is an operator capable of accepting operation. Alternatively, the operator switching unit 176 may analyze an image taken by the in-vehicle camera 94, and switch the operator accepting operation based on the state of the vehicle occupant found from an analysis result. The state of the vehicle occupant can be acquired based on, for example, face characteristic information (the position and shape of each part, such as an eye, nose, and mouth), the orientation of the face, the posture, and the like of the vehicle occupant in the taken image. When judging that the vehicle occupant is in a state (posture) of being incapable of operation with the main operator, the operator switching unit 176 accepts operation made with the auxiliary operator 90. On the other hand, when judging that the vehicle occupant is in a state of being capable of operation with the main operator, the operator switching unit 176 accepts operation made with the main operator.

[Specific Example of Auxiliary Operator]

Figure 13:
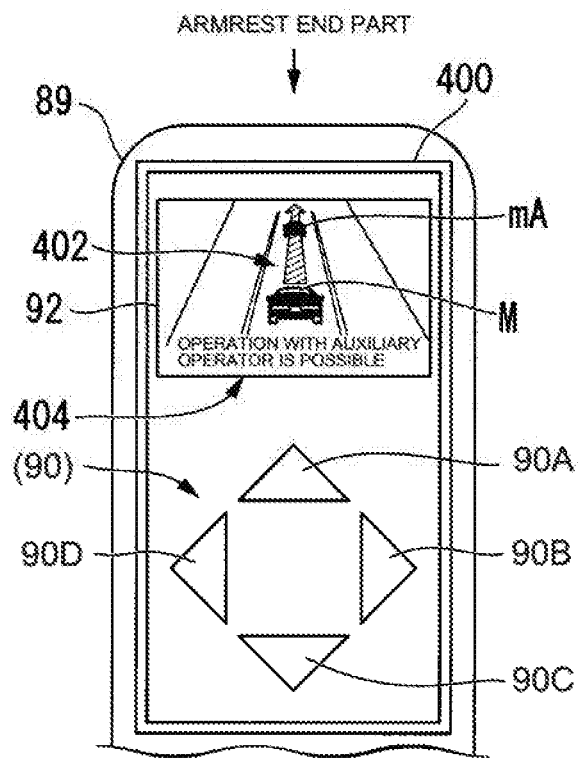
FIG. 13 is a view illustrating an example of the auxiliary operator according to the embodiments.

Next, a specific example of the auxiliary operator is described. FIG. 13 is a view illustrating an example of the auxiliary operator according to the embodiments. The example in FIG. 13 illustrates an auxiliary operator unit 400 including the auxiliary operator 90 and the armrest monitor 91. The auxiliary operator unit 400 may be formed integrally with the armrest 89 at a position near an end part of the armrest 89 (on the armrest surface side), or alternatively may be formed detachably from the armrest 89. For example, the auxiliary operator unit 400 may be used separately from the armrest 89 like a controller. The auxiliary operator unit 400 can interchange data with another configuration in the vehicle control system 100 through wired or wireless communication.

In the example illustrated in FIG. 13, buttons or the like for performing one or both of the velocity control and steering control are arranged as the auxiliary operator 90. For example, the vehicle occupant can perform acceleration control (accelerator control) over the subject vehicle M by pressing an auxiliary operator 90A, and perform deceleration control (brake control) over the subject vehicle M by pressing an auxiliary operator 90C. In addition, by pressing an auxiliary operator 90B, the vehicle occupant can perform control such as making the subject vehicle M move to the right or change lanes to the right of the current travel lane. Further, by pressing an auxiliary operator 90D, the vehicle occupant can perform control such as making the subject vehicle M move to the left or change lanes to the left of the current travel lane. When the armrest 89 is in a usable state (when the subject vehicle M is in the automated driving mode), for example, the operator switching unit 176 performs the above control upon accepting operation made with these auxiliary operators 90A to 90D. Besides, the operator switching unit 176 may adjust the amount of control by means of a period for which each of the auxiliary operators 90A to 90D is pressed or the number of times the auxiliary operator is pressed. The operator switching unit 176 may display the content of control performed by the vehicle occupant on the armrest monitor 91.

In addition, in this embodiment, both the main operator and the auxiliary operator 90 can be made usable. In this case, the main operator is in charge of one of the velocity control and steering control and the auxiliary operator 90 is in charge of the other. Which operator is to be in charge of each control may be set by the operator switching unit 176 in advance. Further, when the main operator and the auxiliary operator 90 are operated at the same time, the operator switching unit 176 may accept the operation with one of the operators with a higher priority than the other. Thereby, erroneous operation can be prevented, and mutual control over operations on the main operator and the auxiliary operator 90 can be performed smoothly.

In addition, an image taken by the camera 40 or the like is displayed on the armrest monitor 91. In this case, the HMI controller 170 controls input to and output from the HMI 70 and, in addition to displaying an image (lanes and signs of a road and peripheral vehicles (such as the preceding vehicle mA)) taken by and acquired from the camera 40, it may display the subject vehicle M (which may be either the entire body or a front portion), an object 402 indicating information on the travel trajectory created by the trajectory creation unit 146, and the like by superimposing/merging these onto/into the taken image, for example. Further, the HMI controller 170 may display operation availability information 404 indicating that operation with the auxiliary operator 90 is possible, for example. Examples of the operation availability information 404 include "operation with auxiliary operator is possible", "operation with auxiliary operator is impossible", and "only operation with main operator is possible", but the operation availability information is not limited to these.

In addition, the armrest monitor 91 may have such a configuration that its screen inclines by a predetermined angle with respect to a front surface (flat surface) of the auxiliary operator unit 400. Further, the constituents of the auxiliary operator unit 400 above may be arranged on either one or both of the armrests 89 located on both sides of the seat 87, or alternatively may be arranged on the seat 87 other than the driver's seat. Furthermore, the auxiliary operator unit 400 may be installed in such a way that some of the auxiliary operators 90A to 90D (e.g. the auxiliary operators 90A and 90C for velocity control) are arranged on one of the left and right armrests 89 and the others (e.g. the auxiliary operators 90B and 90D for steering control) are arranged on the other armrest.

Figure 14:
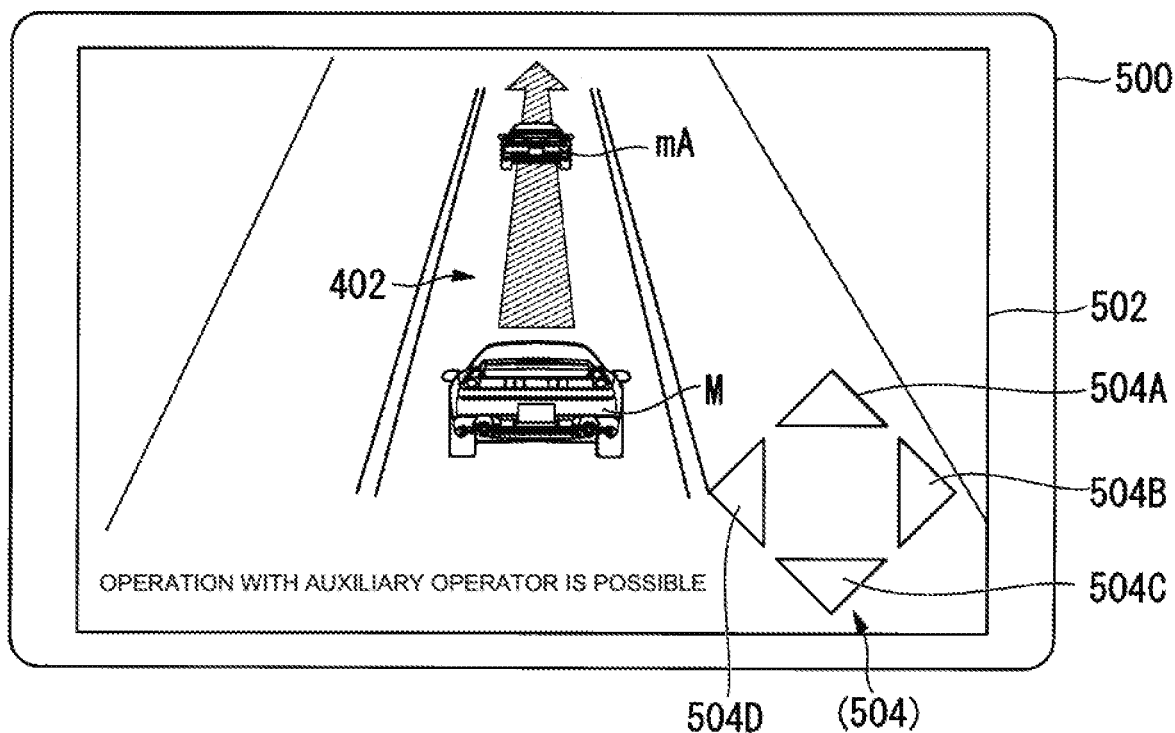
FIG. 14 is a view illustrating an example of the screen of a terminal device having the function of the auxiliary operator.

Besides, the above auxiliary operator (including the armrest monitor 91) above does not necessarily have to be arranged on the armrest 89, and may be embodied by the function of a terminal device held by the vehicle occupant, for example. FIG. 14 is a view illustrating an example of the screen of a terminal device having the function of the auxiliary operator.

In the example of FIG. 14, information such as terminal identification information of a terminal device 500 of the vehicle occupant is registered in the vehicle control system 100 in advance. The HMI controller 170 can control input/output of data and the like to/from the terminal device as a constituent of the HMI 70.

In the example of FIG. 14, as in the example of FIG. 13 described above, an image (lanes and signs of a road and peripheral vehicles (such as the preceding vehicle mA)) taken by the camera 40 is displayed on a screen 502. In addition to the image taken by and acquired from the camera 40, the subject vehicle M, the object 402 indicating information on the travel trajectory, the operation availability information 404, and the like may also be displayed on the screen 502 by superimposing/merging these onto/into the taken image. Further, the HMI controller 170 may display the operation availability information 404 indicating that operation with the auxiliary operator 30 is possible, for example.

In addition, in FIG. 14, an icon object 504 of a GUI switch as an example of the auxiliary operator is displayed by superimposing/merging this object onto/into the image taken by the camera 40. The icon object 504 is an object for performing one or both of the velocity control and the steering control. Further, icon objects 504A to 504D illustrated in FIG. 14 correspond respectively to the auxiliary operators 90A to 90D above. Accordingly, as in the case of the auxiliary operators 90A to 90D, the vehicle occupant can perform velocity control and steering control over the subject vehicle M by touching the icon objects 504A to 504D on the screen 502 at the timing when the auxiliary operator is usable. Here, the content to be displayed on the screen of the terminal device 500, the display timing, and acceptance of operation made by the vehicle occupant are controlled by the HMI controller 170.

Since the terminal device 500 can be used as the auxiliary operator, the vehicle occupant can perform manual driving of the subject vehicle M using the terminal device 500 even when the vehicle occupant is not in a driving posture, such as when the vehicle occupant is sleeping with the backrest portion 87B of the driver's seat as the seat 87 reclined, when the vehicle occupant sits on the seat 87 other than the driver's seat in the subject vehicle M, or when the vehicle occupant is moving in the vehicle compartment of the subject vehicle M. Here, the HMI controller 170 can output the same screen as the terminal device 500 on another HMI 70 (such as the display unit including the navigation system 50 and the display device 82) and accept operation on this HMI, for example.

In addition, by using the auxiliary operator unit 400 and the terminal device 500 above, for example, another vehicle occupant sitting on the passenger's seat or back seat as the seat 87, for example, can perform manual driving of the subject vehicle M instead of the vehicle occupant (driver) who operates the main operator (such as the acceleration pedal 71, the brake pedal 74, and the steering wheel 78).

Here, in order to prevent the auxiliary operator unit 400 and the terminal device 500 from accepting operation made by a person with no driving license such as a child, the HMI controller 170 may perform face recognition using face characteristic information (such as the position, size, and balance of the eyes, nose, and mouse) acquired from an image taken by the in-vehicle camera 94, and perform control so that it accepts operation if the recognition result shows that the auxiliary operator unit 400 and the terminal device 500 are operated by a person who is registered in advance as one allowed to drive a vehicle.

Processing Flow (First Embodiment)

Figure 15:
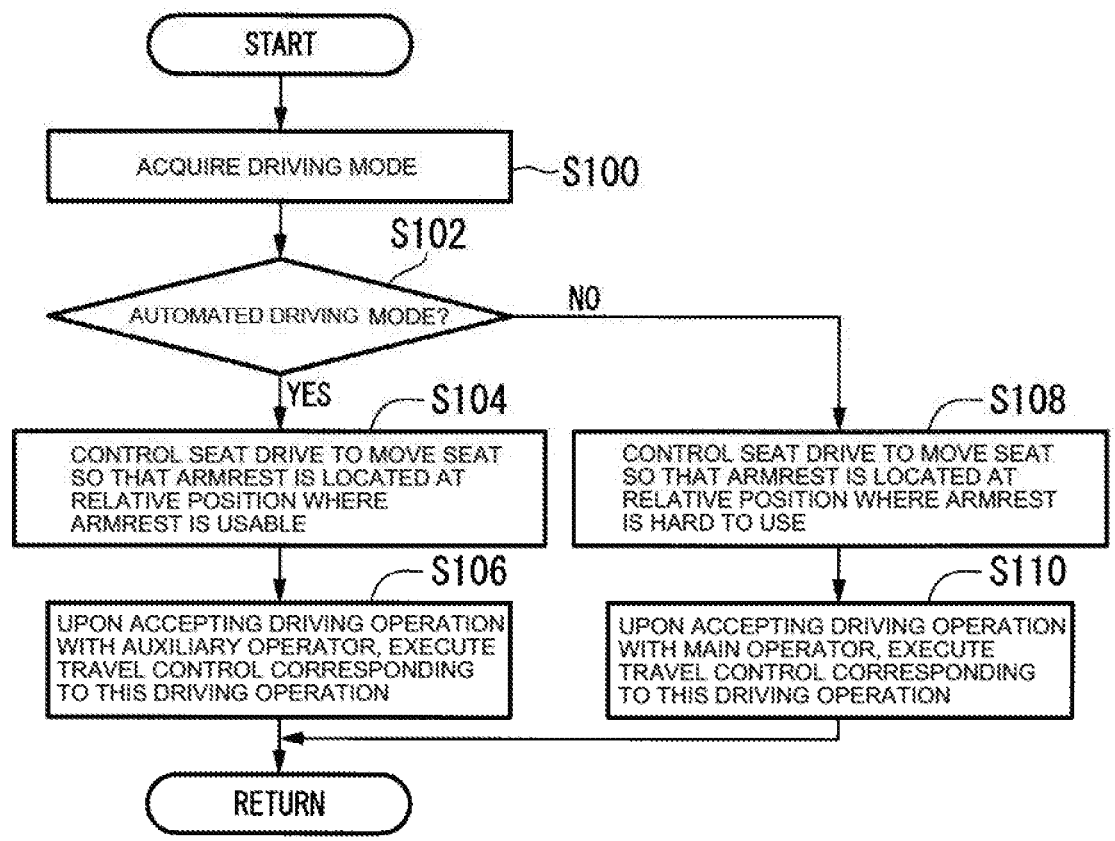
FIG. 15 is a flowchart illustrating an example of operator switching control processing according to the first embodiment.

Hereinbelow, operator switching control processing in the vehicle control system 100 according to the first embodiment is described using a flowchart. FIG. 15 is a flowchart illustrating an example of the operator switching control processing according to the first embodiment. In the example of FIG. 15, the state judgment unit 172 acquires the driving mode controlled by the automated driving controller 120 (Step S100), and judges whether or not the acquired driving mode is the automated driving mode (Step S102). Here, if the driving mode is the automated driving mode (any of modes A to C above), the state judgment unit 172 judges that it is ok to make the armrest 89 usable to the vehicle occupant of the subject vehicle M by letting it stick out. On the other hand, the state judgment unit 172 judges that it is problematic to make the armrest 89 usable to the vehicle occupant if the driving mode acquired from the automated driving controller 120 is the manual driving mode.

If the driving mode is the automated driving mode, the armrest relative position controller 174 controls the seat drive to move the seat 87 so that the armrest 89 may be located at a relative position where the armrest is usable (Step S104). Next, upon accepting a driving operation with the auxiliary operator 90 on the armrest 89, the operator switching unit 176 executes travel control over the subject vehicle M that corresponds to this driving operation (Step S106).

On the other hand, if the driving mode is not the automated driving mode, the armrest relative position controller 174 controls the seat drive 88 to move the seat 87 so that the armrest 89 may be located at a relative position where the armrest is hard to use (Step S108). Next, upon accepting a driving operation with the main operator, the operator switching unit 176 executes travel control over the subject vehicle M that corresponds to this driving operation (Step S110). Here, in the processes of Step S104 and Step S108 above, the control of moving the seat 87 is not executed if the seat 87 is already moved to the predetermined relative position. Further, the processing illustrated in FIG. 15 is iterated every time the driving mode is switched or for every predetermined time interval.

The first embodiment described above performs control so that the position of the armrest relative to the occupant sitting on the seat 87 varies between automated driving executed by the automated driving controller 120 and manual driving. Thereby, the armrest 89 can be controlled suitably based on whether automated driving is active. In addition, the first embodiment includes the auxiliary operator 90 that can be operated by the occupant sitting on the seat 87 when automated driving is executed by the automated driving controller 120. This auxiliary operator 90 is arranged on the armrest 89 that is supported so as not to move in conjunction with the longitudinal movement of the seat 87, and can be operated by the vehicle occupant when the seat 87 is driven rearward with respect to the subject vehicle M. This enables the vehicle occupant to drive the subject vehicle M using the auxiliary operator even when the occupant is in a posture of being incapable of operation with the main operator.

Here, in the handover control in which the driving mode transitions from the automated driving mode (the driving mode where no obligation of monitoring the periphery of the subject vehicle M is applied to the vehicle occupant at the driver's seat) to the manual driving mode (the driving mode where the obligation of monitoring the periphery of the subject vehicle M is applied to the vehicle occupant at the driver's seat) at a location such as the vicinity of the scheduled automated driving mode end point set in the action plan information 186 for example, the first embodiment enables operation with the auxiliary operator 90 until the transition of the mode is completed. In this way, the auxiliary operator 90 is used instead for the driving operation during the switching of the driving mode, which can smooth the transition of mode switching. Further, according to the first embodiment, temporary manual driving (e.g., a driving mode which returns to automated driving quickly after short-time manual driving, such as a mode at the time of sudden lane change due to an accident for example) is available using the auxiliary operator 90 instead of the main operator.

Second Embodiment

Figure 16:
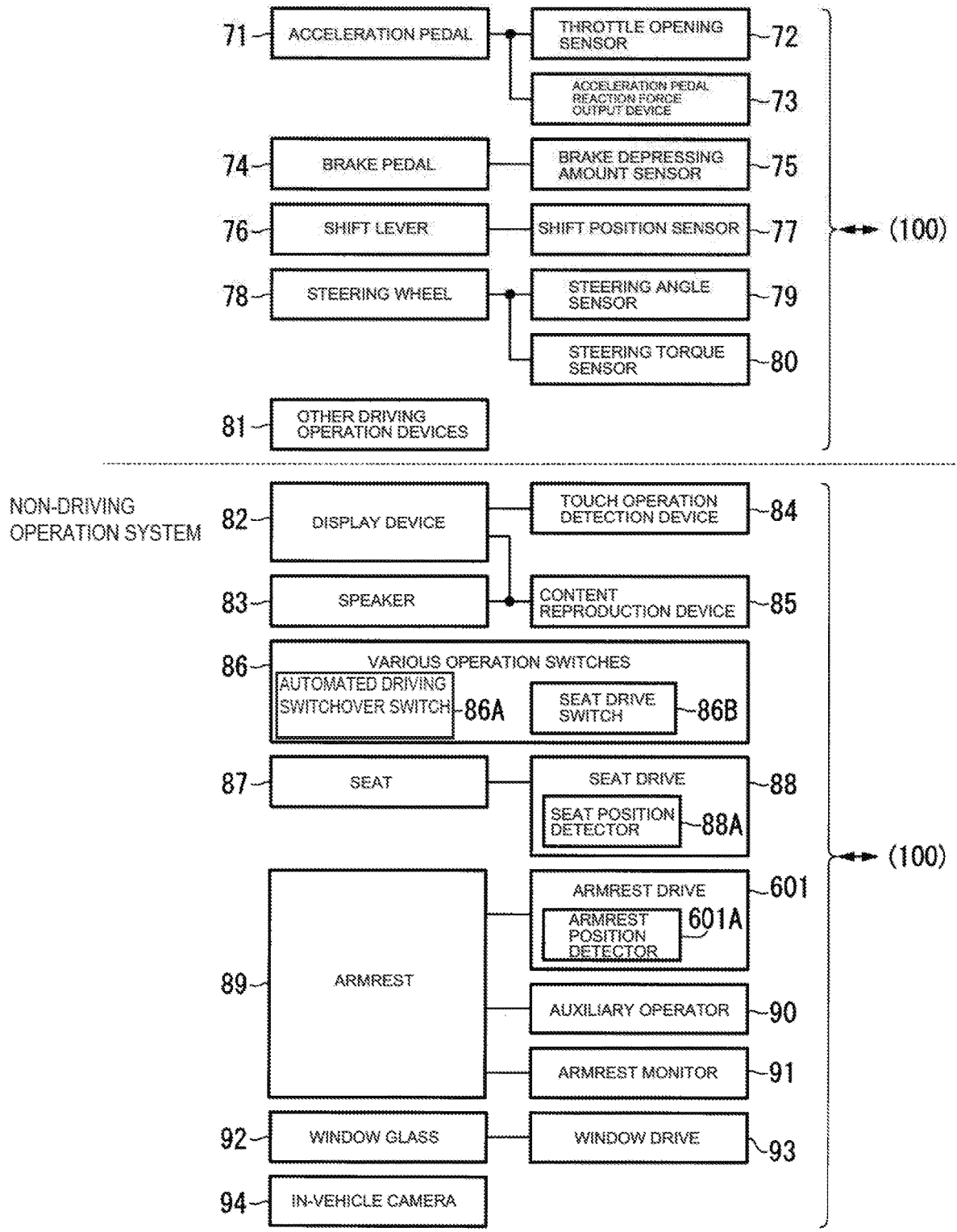
FIG. 16 is a block diagram illustrating an HMI 600 according to a second embodiment of the present disclosure.

Next, a second embodiment of the present disclosure is described using the drawings. FIG. 16 is a block diagram illustrating an HMI 600 according to the second embodiment. Note that, since the configuration of a vehicle equipped with the vehicle control system 100 and the functional configuration of the vehicle control system 100 in the second embodiment are the same as the first embodiment, they are not described specifically here. In addition, the HMI 600 in the second embodiment differs from the HMI 70 only in that an armrest drive (drive unit) 601 is added to the configuration of the HMI 70 illustrated in FIG. 3. Accordingly, in the following description, the armrest drive 601 is described, and the same configuration as the first embodiment is not described.

In the HMI 600 in the second embodiment, the armrest drive 601 is configured to drive a motor and the like to turn the armrest 89 about a predetermined position (such as a joint) and move the armrest in the longitudinal and vertical directions. For example, the armrest drive 601 moves the armrest 89 to a predetermined position automatically according to the driving mode of the subject vehicle M. Further, the armrest drive 601 may include an armrest position detector 601A configured to detect the angle of inclination of the armrest 89 and the longitudinal and vertical positions of the armrest.

For example, the state judgment unit 171 is configured to judge, as in the first embodiment described above, whether or not it is ok to make the armrest 89 usable to the vehicle occupant of the subject vehicle M by letting it stick out.

The armrest relative position controller 174 is configured to control the armrest drive 601 so that the position of the armrest 89 relative to the vehicle occupant sitting on the driver's seat as the seat 87 varies between automated driving executed by the automated driving controller 120 and manual driving.

Figure 17A:
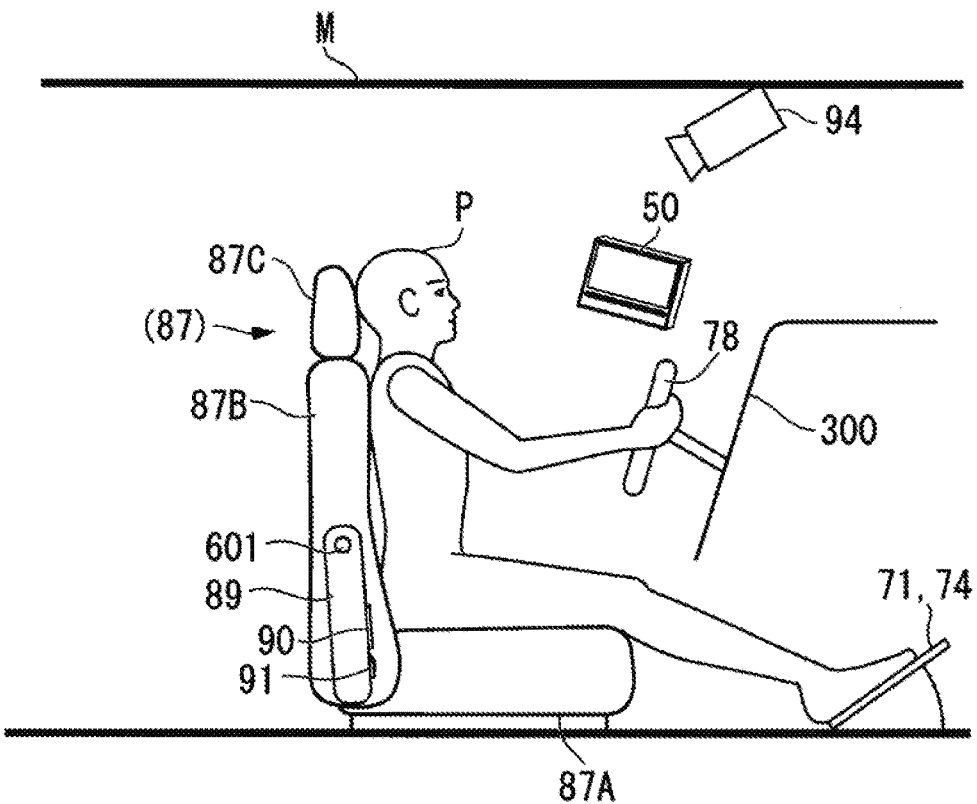
FIG. 17A and FIG. 17B are an explanatory view of an operation example using an auxiliary operator according to the second embodiment.
Figure 17B:
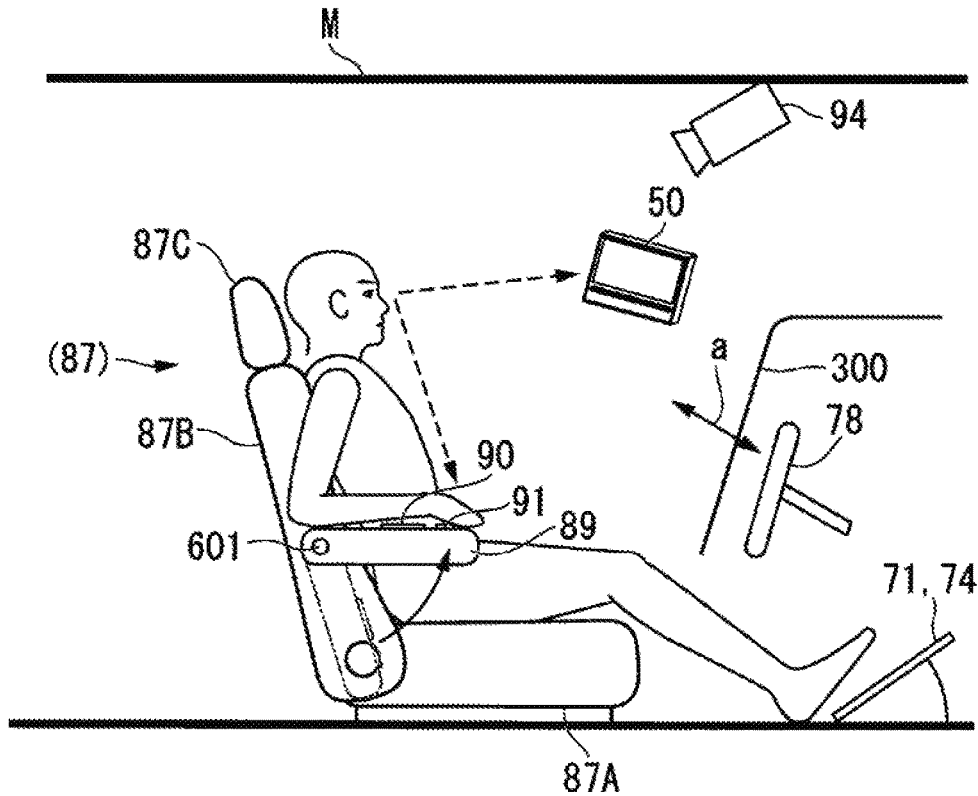

Hereinbelow, the relationship between the seat 87 and the armrest 89 according to the second embodiment is described with reference to FIGS. 17A, 17B. FIGS. 17A, 17B are an explanatory view of an operation example using an auxiliary operator according to the second embodiment. FIG. 17A is a view illustrating a layout example of the seat 87 and the armrest 89 in the case of the manual driving mode, and FIG. 17B is a view illustrating a layout example of the seat 87 and the armrest 89 in the case of the automated driving mode. Note that, since the constituents of FIGS. 17A, 17B are the same as those of the example illustrated in FIGS. 4A, 4B, they are not described specifically here.

In the second embodiment, as compared with the first embodiment described above, the armrest 89 is disposed on a side surface of the seat 87. In addition, the armrest 89 in the second embodiment is provided with the auxiliary operator 90 and armrest monitor 91 described above. Here, the auxiliary operator 90 and the armrest monitor 31 are implemented by the configuration illustrated in FIGS. 13 and 14.

In the second embodiment, while the vehicle occupant P is driving the subject vehicle M manually using the main operator, the armrest 89 is located at a relative position where the armrest 89 is hard to use for the vehicle occupant P (the position along a side surface of the backrest portion 87B, for example) as illustrated in FIG. 17A.

Here, in the case where the subject vehicle M is switched to mode A of the automated driving mode, the vehicle occupant P does not need to drive the subject vehicle M manually. Thus, the HMI controller 70 performs control to store the main operator such as the steering wheel 78 in the garnish (such as the dashboard) 300.

In addition, in the case where the driving mode of the subject vehicle M is switched to the automated driving mode, the armrest relative position controller 174 of the HMI controller 170 causes the armrest drive 601 to move (turn) the armrest 89 to a position (horizontal position) illustrated in FIG. 17B. Here, the vehicle occupant P may manually move (turn) the armrest 89 to the position illustrated in FIG. 17B. Thereby, the vehicle occupant P can put his/her elbow or arm on the armrest and relax.

Additionally, the operator switching unit 176 activates operation made with the auxiliary operator 90 when the armrest 89 is moved to the position illustrated in FIG. 17B. Here, the operator switching unit 176 may switch whether or not operation input with the auxiliary operator 90 is acceptable depending on the driving mode of the subject vehicle M or at the timing of driving mode switching control.

Further, in the second embodiment, as in the first embodiment, it is also possible to display, on the display unit such as the armrest monitor 91 or the navigation system 50, images taken by the camera 40 and the like and information indicating that a driving operation can be made on the auxiliary operator 90. This enables the vehicle occupant P to easily know that a driving operation can be made on the auxiliary operator 90. Furthermore, the vehicle occupant P can also perform velocity control or steering control over the subject vehicle M by operating the auxiliary operator 90 while looking at the armrest monitor 91 or the navigation system 50.

Processing Flow (Second Embodiment)

Figure 18:
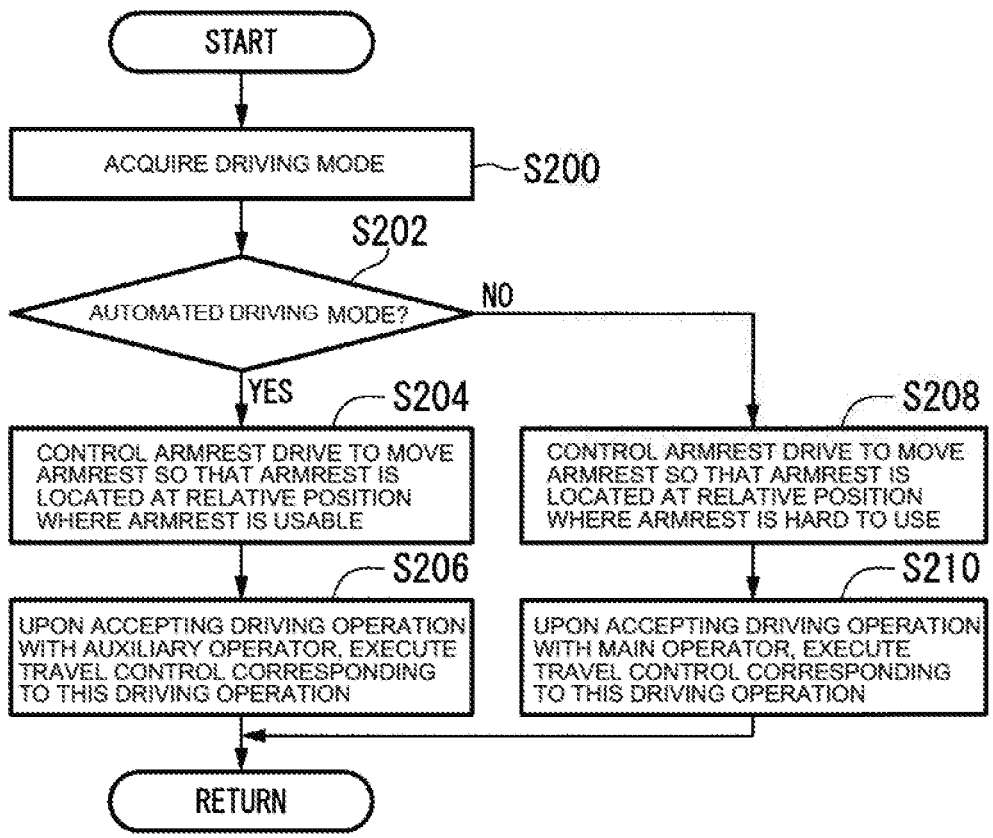
FIG. 18 is a flowchart illustrating an example of operator switching control processing according to the second embodiment.

Hereinbelow, operator switching control processing in the vehicle control system 100 according to the second embodiment is described using a flowchart. FIG. 18 is a flowchart illustrating an example of the operator switching control processing according to the second embodiment. Note that, since processes in the example of FIG. 18 other than the processes in Step S204 and Step S208 are the same as those of the operator switching control processing according to the first embodiment described above, they are not described specifically here.

If the driving mode is the automated driving mode in the process of Step S202, the armrest relative position controller 174 controls the armrest drive 601 to move the armrest 89 so that the armrest 89 may be located at a relative position where the armrest is usable (Step S204). On the other hand, if the driving mode is not the automated driving mode, the armrest relative position controller 174 controls the armrest drive 601 to move the armrest 89 so that the armrest 89 may be located at a relative position where the armrest is hard to use (Step S208). Here, in the processes of Step S204 and Step S208 above, the control of moving the armrest 89 is not executed if the armrest 89 is already moved to the predetermined relative position. Further, the processing illustrated in FIG. 18 is iterated every time the driving mode is switched or for every predetermined time interval.

As described above, if the subject vehicle M is in automated driving, for example, the second embodiment causes the armrest drive 601 to control the position of the armrest 89 so that the armrest 89 may be located at a relative position where the armrest is usable. On the other hand, if the subject vehicle M is not in automated driving, the second embodiment causes the armrest drive 601 to control the position of the armrest 89 so that the armrest may be located at a relative position where the armrest is hard to use. Thereby, the armrest 89 can be controlled suitably based on whether automated driving is active. This enables the vehicle occupant P to perform manual driving of the subject vehicle M in a relaxing posture using the auxiliary operator 90 arranged on the armrest 89. Note that it is possible to partially or entirely combine the first and second embodiments described above into different embodiments.

Hereinabove, the various embodiments have been described; however, the invention is not in any way limited to these embodiments, and the embodiments may be modified in various ways or replaced with other variations without departing from the gist of the invention. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle control system comprising:
a driving controller configured to, by executing any one of a plurality of driving modes having different automatic control levels from each other, execute any one of
automated driving for automatically performing at least one of velocity control and steering control over a vehicle and
manual driving for performing both of said velocity control and steering control over said vehicle based on operation on a main operator by an occupant of said vehicle;
an armrest for an occupant sitting on a driver's seat of said vehicle to put his/her arm on; and
an armrest relative position controller configured to control a drive unit such that a position of said armrest relative to said occupant sitting on said driver's seat varies between said automated driving and said manual driving executed by said driving controller,
wherein
said drive unit drives said driver's seat in a longitudinal direction,
said armrest is supported so as not to move in conjunction with longitudinal movement of said driver's seat, and
said armrest relative position controller controls said drive unit to drive said driver's seat rearward to locate said armrest at a position ahead of said driver's seat and locate said armrest at a relative position where said armrest is usable by the occupant.

2. The vehicle control system according to claim 1, wherein said armrest relative position controller controls said drive unit such that:
said armrest is located at a relative position where said armrest is usable by the occupant when said automated driving is performed by said driving controller, and
said armrest is located at a relative position where said armrest is hard to use by the occupant when the automated driving is not performed by said driving controller.

3. A vehicle control system comprising:
a driving controller configured to, by executing any one of a plurality of driving modes having different automatic control levels from each other, execute any one of
automated driving for automatically performing at least one of velocity control and steering control over a vehicle and
manual driving for performing both of said velocity control and steering control over said vehicle based on operation on a main operator by an occupant of said vehicle;
an armrest for an occupant sitting on a driver's seat of said vehicle to put his/her arm on; and
an armrest relative position controller configured to control a drive unit such that a position of said armrest relative to said occupant sitting on said driver's seat varies between said automated driving and said manual driving executed by said driving controller,
wherein
said armrest includes an auxiliary operator that is operable by said occupant sitting on said driver's seat, and
said driving controller controls travel of said vehicle in accordance with operation input to said auxiliary operator and in accordance with an execution state of said automated driving and said manual driving.

4. The vehicle control system according to claim 3, wherein, when the mode is switched from said automated driving to said manual driving, said driving controller controls the travel of said vehicle based on the operation input to said auxiliary operator.

5. The vehicle control system according to claim 3, further comprising a display device displaying information indicating that a driving operation on said auxiliary operator is possible.

6. The vehicle control system according to claim 4, wherein when the mode is switched from said automated driving to said manual driving, said driving controller controls the travel of said vehicle in accordance with the operation input to said auxiliary operator only during transition time for switching from said automated driving to said manual driving.

7. The vehicle control system according to claim 3, wherein the auxiliary operator is a mobile terminal device, and the driving controller determines whether the input to the mobile terminal device is performed by a person who is registered as a permitted person in advance.

8. A vehicle control system comprising:
a driving controller configured to, by executing any one of a plurality of driving modes having different automatic control levels from each other, perform switching control between:
automated driving for automatically performing at least one of velocity control and steering control over a vehicle, and
manual driving for performing both of said velocity control and steering control over said vehicle based on operation on a main operator by an occupant of said vehicle; and
an auxiliary operator configured to become operable by an occupant sitting on a driver's seat when said automated driving is executed by said driving controller,
wherein, when the mode is switched from said automated driving to said manual driving, said driving controller controls travel of said vehicle based on operation input to said auxiliary operator, and
wherein, when the mode is switched from said automated driving to said manual driving, said driving controller controls the travel of said vehicle in accordance with the operation input to said auxiliary operator only during transition time for switching from said automated driving to said manual driving.

9. The vehicle control system according to claim 8, wherein
said driver's seat is driven in a longitudinal direction by a drive unit, and
said auxiliary operator is disposed to an armrest that is supported so as not to move in conjunction with longitudinal movement of said driver's seat, and becomes operable by said occupant sitting on said driver's seat when said driver's seat is driven rearward by said drive unit.

10. A vehicle control method causing an in-vehicle computer
to execute, by executing any one of a plurality of driving modes having different automatic control levels from each other, any one of:
automated driving for automatically performing at least one of velocity control and steering control over a vehicle, and
manual driving for performing both of said velocity control and steering control over said vehicle based on operation on a main operator by an occupant of said vehicle; and
to control a drive unit such that a relative position of an armrest for an occupant sitting on a driver's seat of said vehicle to put his/her arm on varies between said automated driving and said manual driving,
wherein
said drive unit drives said driver's seat in a longitudinal direction,
said armrest is supported so as not to move in conjunction with longitudinal movement of said driver's seat, and
said method causes the in-vehicle computer to control said drive unit to drive said driver's seat rearward to locate said armrest at a position ahead of said driver's seat and locate said armrest at a relative position where said armrest is usable by the occupant.

11. A non-transitory computer readable medium storing a vehicle control program causing an in-vehicle computer
to execute, by executing any one of a plurality of driving modes having different automatic control levels from each other, any one of:
automated driving for automatically performing at least one of velocity control and steering control over a vehicle, and
manual driving for performing both of said velocity control and steering control over said vehicle based on operation on a main operator by an occupant of said vehicle; and
to control a drive unit such that a relative position of an armrest for an occupant sitting on a driver's seat of said vehicle to put his/her arm on varies between said automated driving and said manual driving,
wherein
said drive unit drives said driver's seat in a longitudinal direction,
said armrest is supported so as not to move in conjunction with longitudinal movement of said driver's seat, and
said vehicle control program causes the in-vehicle computer to control said drive unit to drive said driver's seat rearward to locate said armrest at a position ahead of said driver's seat and locate said armrest at a relative position where said armrest is usable by the occupant.

12. A vehicle control system comprising:
a driving controller configured to, by executing any one of a plurality of driving modes having different automatic control levels from each other, perform switching control between:
automated driving for automatically performing at least one of velocity control and steering control over a vehicle, and
manual driving for performing both of said velocity control and steering control over said vehicle based on operation on a main operator by an occupant of said vehicle; and
an auxiliary operator configured to become operable by an occupant sitting on a driver's seat when said automated driving is executed by said driving controller,
wherein
said auxiliary operator is configured to change a position between a projected position and a retracted position such that the auxiliary operator switches the position thereof from the retracted position to the projected position when said automated driving is activated by said driving controller.

13. A vehicle control method causing an in-vehicle computer
    to execute, by executing any one of a plurality of driving modes having different automatic control levels from each other, any one of:
        automated driving for automatically performing at least one of velocity control and steering control over a vehicle, and
        manual driving for performing both of said velocity control and steering control over said vehicle based on operation on a main operator by an occupant of said vehicle; and
    to control a drive unit such that a relative position of an armrest for an occupant sitting on a driver's seat of said vehicle to put his/her arm on varies between said automated driving and said manual driving,
    wherein
    said armrest includes an auxiliary operator that is operable by said occupant sitting on said driver's seat, and
    said method causes the in-vehicle computer to control travel of said vehicle in accordance with operation input to said auxiliary operator and in accordance with an execution state of said automated driving and said manual driving.

14. A vehicle control method causing an in-vehicle computer to execute processing comprising steps of:
    performing, by executing any one of a plurality of driving modes having different automatic control levels from each other, switching control between:
        automated driving for automatically performing at least one of velocity control and steering control over a vehicle, and
        manual driving for performing both of said velocity control and steering control over said vehicle based on operation on a main operator by an occupant of said vehicle;
    making an auxiliary operator operable by an occupant sitting on a driver's seat when said automated driving is executed by said driving controller; and
    when the mode is switched from said automated driving to said manual driving, controlling travel of said vehicle in accordance with operation input to said auxiliary operator only during transition time for switching from said automated driving to said manual driving.

* * * * *